US011464276B2

(12) United States Patent
Sackett

(10) Patent No.: US 11,464,276 B2
(45) Date of Patent: Oct. 11, 2022

(54) POINTE SHOES AND OTHER FOOTWEAR FOR DANCE PERFORMANCE AND DANCE TRAINING

(71) Applicant: Emily Jane Sackett, San Diego, CA (US)

(72) Inventor: Emily Jane Sackett, San Diego, CA (US)

(73) Assignee: Emily Jane Sackett, San Diego, CA (US)

( * ) Notice: Subject to any disclaimer, the term of this patent is extended or adjusted under 35 U.S.C. 154(b) by 397 days.

(21) Appl. No.: 16/806,913

(22) Filed: Mar. 2, 2020

(65) Prior Publication Data

US 2020/0275729 A1   Sep. 3, 2020

Related U.S. Application Data

(60) Provisional application No. 62/812,923, filed on Mar. 1, 2019.

(51) Int. Cl.
*A43B 3/36* (2022.01)
*G09B 19/00* (2006.01)
*A43B 5/12* (2006.01)
*F21V 23/04* (2006.01)

(52) U.S. Cl.
CPC .................. *A43B 3/36* (2022.01); *A43B 5/12* (2013.01); *F21V 23/04* (2013.01); *F21V 23/045* (2013.01); *F21V 23/0435* (2013.01); *F21V 23/0485* (2013.01); *F21V 23/0492* (2013.01); *G09B 19/0015* (2013.01)

(58) Field of Classification Search
CPC .. F21V 23/04; F21V 23/0435; F21V 23/0485; F21V 23/0492; F21V 33/0008; G09B 19/0015; A43B 15/12; A43B 3/36; F21W 2121/06
See application file for complete search history.

(56) References Cited

U.S. PATENT DOCUMENTS

| | | |
|---|---|---|
| 3,070,907 A | 1/1963 | Rocco |
| 5,329,432 A | 7/1994 | Bland |
| 5,732,486 A | 3/1998 | Rapisarda |
| 5,821,858 A | 10/1998 | Stone |
| 5,903,103 A | 5/1999 | Garner |
| 5,909,088 A | 6/1999 | Wut |
| 6,065,851 A | 5/2000 | So |
| 6,104,140 A | 8/2000 | Wut |
| 6,354,712 B1 | 3/2002 | Anteby |
| 6,619,812 B2 | 9/2003 | Rapisarda |

(Continued)

*Primary Examiner* — Rajarshi Chakraborty
*Assistant Examiner* — Steven Y Horikoshi
(74) *Attorney, Agent, or Firm* — Perkins Coie LLP

(57) ABSTRACT

Disclosed are systems, kits and methods for smart footwear for dance performances, as well as computer-implemented methods to train performers using the smart footwear. An example method for improving a dance technique or a dance performance by a performer, comprises receiving, using a radio frequency (RF) transceiver on a wireless device, a signal from an RF transmitter on a pointe shoe, determining, based on the signal, an activation status of each of a plurality of pressure sensors on the pointe shoe, and providing, based on the activation status, an indication of an accuracy or efficacy of the performer standing en pointe during the dance technique or dance performance.

20 Claims, 16 Drawing Sheets

(56) References Cited

U.S. PATENT DOCUMENTS

| | | |
|---|---|---|
| 7,083,296 B2 * | 8/2006 | Chiang ................ A43B 1/0036 36/137 |
| 7,170,019 B2 | 1/2007 | Wong |
| 7,695,154 B2 | 4/2010 | Ellenburg |
| 7,794,101 B2 | 9/2010 | Galica |
| 8,464,442 B1 | 6/2013 | Alford, II |
| 8,752,310 B1 | 6/2014 | Smith, III |
| 9,015,965 B2 | 4/2015 | Smith, III |
| 9,265,299 B2 | 2/2016 | Smith, III |
| 10,548,365 B2 * | 2/2020 | Sackett ................ H05B 47/19 |
| 2004/0233658 A1 | 11/2004 | Hsu |
| 2006/0032085 A1 | 2/2006 | Randall |
| 2006/0104047 A1 | 5/2006 | Guzman |
| 2007/0011919 A1 | 1/2007 | Case, Jr. |
| 2007/0144040 A1 | 6/2007 | Chen |
| 2007/0201221 A1 | 8/2007 | Cherdak |
| 2008/0258921 A1 * | 10/2008 | Woo ................... A63B 24/0062 482/8 |
| 2010/0146822 A1 * | 6/2010 | MacGregor ............. A43B 5/12 340/686.1 |
| 2011/0265348 A1 * | 11/2011 | Schmutte ............. A43B 7/1464 264/138 |
| 2014/0157632 A1 | 6/2014 | Kim |
| 2014/0196318 A1 | 7/2014 | Verheem |
| 2015/0003047 A1 | 1/2015 | Lin |
| 2015/0029005 A1 | 1/2015 | Kim |
| 2016/0061426 A1 | 3/2016 | Gou |
| 2016/0091186 A1 | 3/2016 | Chow |
| 2018/0054663 A1 * | 2/2018 | Markison ................ A61B 5/16 |

* cited by examiner

POINTE SHOES AND OTHER FOOTWEAR FOR DANCE PERFORMANCE AND DANCE TRAINING

CROSS-REFERENCE TO RELATED APPLICATION

This application claims the benefit of U.S. Provisional Application 62/812,923, filed on Mar. 1, 2019, which is expressly incorporated herein by reference in its entirety for all purposes.

TECHNICAL FIELD

This patent document relates to dance performance shoes, e.g., ballet, tap, jazz, etc., kits for the dance performance shoes, and a wireless device that can interface with the dance performance shoes.

BACKGROUND

Ballet is a highly technical dance performance that is enjoyed and appreciated the world over. Pointe shoes are a type of shoe worn by ballet performers. They are an integral part of classical ballet, and make the performers appear weightless and enable them to dance en pointe for extended periods of time.

SUMMARY

Methods, systems and kits for smart pointe shoes and other footwear for dance performance and dance training, as well as wireless devices that can be configured to interact with the smart pointe shoes, are disclosed. In order to improve technique and accentuate intricate ballet movements, such as kicks and twirls, pirouettes and arabesques, the disclosure provides attaching light-emitting diodes (LEDs), sensors and a transceiver to a pointe shoe, and a wireless device that can communicate with the transceiver on the pointe shoe.

In one aspect, a system for improving a dance technique or a dance performance by a performer, comprises a pointe shoe, comprising: a light-emitting diode (LED) ribbon affixed to an external surface of the pointe shoe, a power source, a rigid enclosure within a front end of the pointe shoe that encases and supports toes of the performer, wherein a front end of the rigid enclosure is flattened to form a platform upon which the performer can balance when standing en pointe, a plurality of pressure sensors, in the rigid enclosure or affixed to the platform, configured to activate when the performer stands en pointe during the dance performance, wherein the each of the plurality of pressure sensors comprises a capacitive layer, and wherein standing en pointe comprises the performer standing on the tips of their toes, a radio frequency (RF) transmitter operatively connected to the plurality of pressure sensors and configured to be activated when at least one of the plurality of pressure sensors is activated, and at least one wire connecting the power source to the LED ribbon, the plurality of pressure sensors and the RF transmitter; and a wireless device comprising: a processor, and an RF transceiver, wherein the processor is configured to: receive, using the RF transceiver, a signal from the RF transmitter, determine, based on the signal, an activation status of each of the plurality of pressure sensors, and provide, based on the activation status, an indication of an accuracy or efficacy of the performer standing en pointe during the dance technique or dance performance.

In another aspect, a method for improving a dance technique or a dance performance by a performer, comprises receiving, using a radio frequency (RF) transceiver on a wireless device, a signal from an RF transmitter on a pointe shoe; determining, based on the signal, an activation status of each of a plurality of pressure sensors on the pointe shoe; and providing, based on the activation status, an indication of an accuracy or efficacy of the performer standing en pointe during the dance technique or dance performance, wherein the pointe shoe comprises: a light-emitting diode (LED) ribbon affixed to an external surface of the pointe shoe, a power source, a rigid enclosure within a front end of the pointe shoe that encases and supports toes of the performer, wherein a front end of the rigid enclosure is flattened to form a platform upon which the performer can balance when standing en pointe, and at least one wire connecting the power source to the LED ribbon, the plurality of pressure sensors and the RF transmitter, wherein the plurality of pressure sensors, in the rigid enclosure or affixed to the platform, is configured to activate when the performer stands en pointe during the dance performance, wherein the each of the plurality of pressure sensors comprises a capacitive layer, and wherein standing en pointe comprises the performer standing on the tips of their toes, and wherein the RF transmitter is operatively connected to the plurality of pressure sensors and configured to be activated when at least one of the plurality of pressure sensors is activated.

In yet another aspect, a kit for enhancing a pointe shoe for improving a dance technique or a dance performance by a performer, the kit comprises a pointe shoe, comprising: a rigid enclosure within a front end of the pointe shoe that encases and supports toes of the performer, wherein a front end of the rigid enclosure is flattened to form a platform upon which the performer can balance when standing en pointe, and a piece of rigid material that stiffens a sole of the pointe shoe to provide support for an arch of an en pointe foot of the performer; a light-emitting diode (LED) ribbon; a power source; a plurality of pressure sensors; a radio frequency (RF) transmitter; and at least one wire, wherein the LED ribbon is configured to be affixed to an external surface of the pointe shoe, wherein the plurality of pressure sensors is configured to be inserted into the rigid enclosure or affixed to the platform, and to activate when the performer stands en pointe during the dance performance, wherein the each of the plurality of pressure sensors comprises a capacitive layer, and wherein standing en pointe comprises the performer standing on the tips of their toes, wherein the RF transmitter is configured to be operatively connected to the plurality of pressure sensors, and to be activated when at least one of the plurality of pressure sensors is activated, wherein the at least one wire is configured to connect the power source to the LED ribbon, the plurality of pressure sensors and the RF transmitter, and wherein a wireless device that is paired to the pointe shoe is configured to: receive a signal from the RF transmitter affixed to the pointe shoe, determine, based on the signal, an activation status of each of the plurality of pressure sensors, and provide, based on the activation status, an indication of an accuracy or efficacy of the performer standing en pointe during the dance technique or dance performance.

The subject matter described in this patent document can be implemented in specific ways that provide one or more of the following features.

Figure 1A:
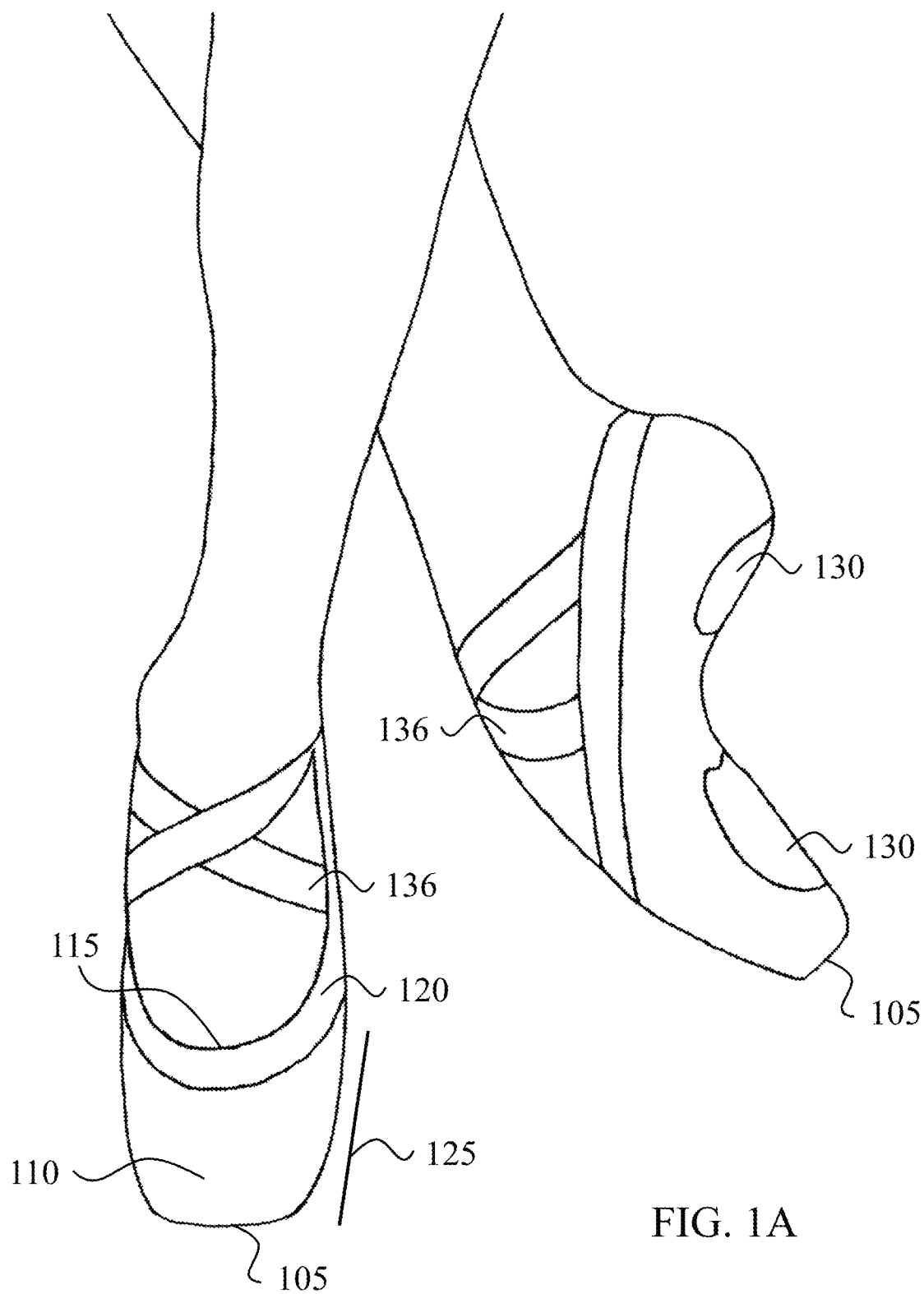
FIG. 1A shows the different parts of ballet slippers.

Like labels are used to refer to the same or similar features in the drawings.

DETAILED DESCRIPTION

Disclosed are devices, kits and methods that may be used for embodiments of a smart pointe shoe for ballet. Pointe shoes with LEDs, which may be activated based on a performer's movements, may enhance ballet performances, both classical and modern, and may be tracked by a wireless device that communicates with the smart pointe shoes. Certain aspects of the disclosed embodiments are shown in one or more of the figures. As such, every aspect of the embodiment in a particular figure may not be explicitly described in the context of that figure. Components may be described and claimed as connected or operatively connected, both of which are interpreted to mean that the components may be either directly or indirectly connected, but able to perform the function specified and/or described.

Section headings are used in the present document to improve readability of the description and do not in any way limit the discussion or the embodiments (and/or implementations) to the respective sections only.

Overview of a Pointe Shoe

Figure 1B:
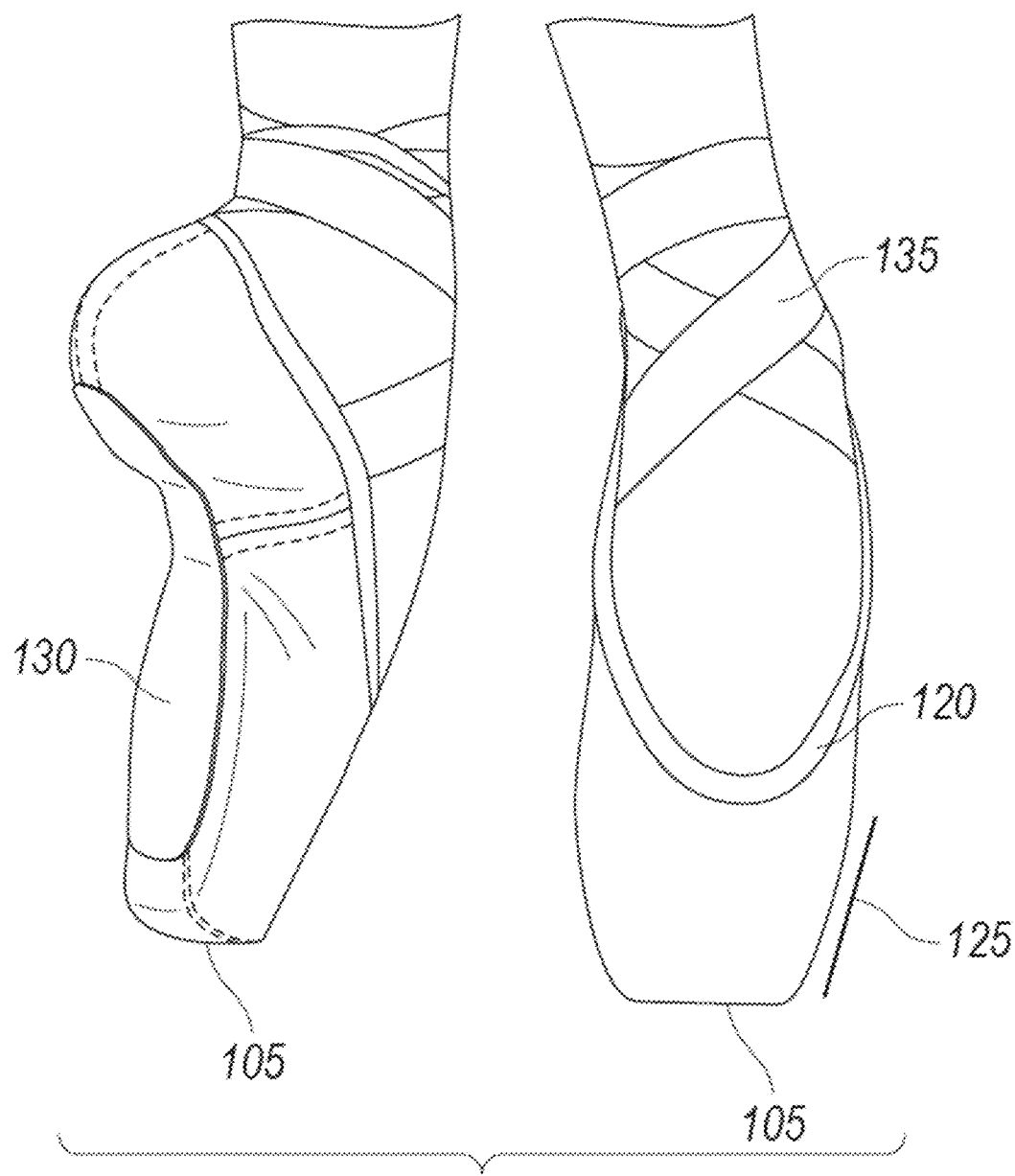
FIGS. 1B and 1C show the different parts of pointe shoes for ballet performances.
Figure 1C:
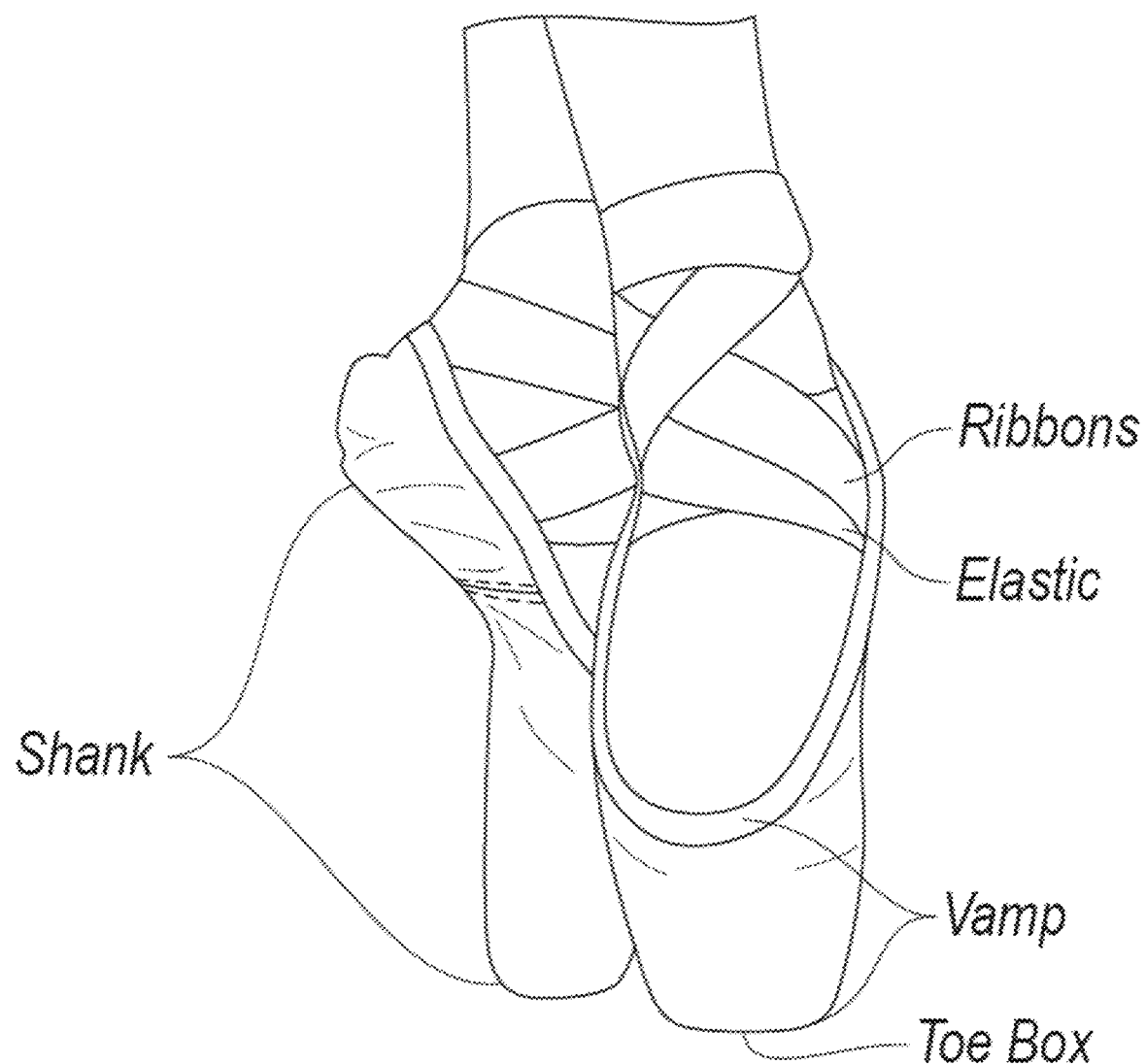

FIG. 1A shows the different parts of a ballet slipper, and FIGS. 1B and 1C show the different parts of a pointe shoe for ballet performances. Pointe shoes share two important structural features that enable dancers to dance on the tips of their toes: (i) a box within the front end of the shoe that encases and supports the dancer's toes, and (ii) a shank, which is a piece of rigid material that serves to stiffen the sole so as to provide support for the arch of the en pointe foot.

In some embodiments, the external surface of a pointe shoe is covered with fabric, thus concealing the box and other internal structural elements and lending an aesthetically pleasing look to the shoe. For example, pointe shoes may be covered with satin or canvas. Pointe shoes may be available in light pink colors, and less commonly in black and white.

As shown in FIGS. 1A and 1B, the vamp (110) refers to the length of the box (125) and material from the toe platform (105) to the opening of the shoe, which is known as the throat (115). In some embodiments, the vamp is v-shaped. In other embodiments, it may be round. The lip of the opening of the shoe is referred to as the binding (120), and in some embodiments, a drawstring may run through the binding. The box (125) is a rigid enclosure within the front end of the shoe that encases and supports the dancer's toes. The front end of the box (125) is flattened so as to form a platform (105) upon which the dancer can balance, and fabric covers the exterior of the box for aesthetics.

In some embodiments, the sole (130) of the pointe shoe may be constructed from a piece of leather that is attached to the shoe with adhesive and reinforced by stitching along its edges. The sole overlaps and secures the unfinished edges of the shoe's exterior fabric. Pointe shoes may be manufactured with either scraped soles, which provide superior traction, or buffed soles, which have a smoother surface for reduced traction.

Aesthetic appearance is of paramount importance for modern pointe shoes. In some embodiments, and to achieve an elegant appearance, the shoe's more decorative outer fabric may be prominently featured, covering the maximum possible area of the shoe's visible surfaces. In an example, the sole (130) may be made of thin material to give it a minimal profile, and a margin of satin is pleated around it so that the sole covers only part of the bottom of the shoe.

A pointe shoe may employ one or more elastic bands (136) to secure it to the foot. The elastic band—which traverses the front of the ankle and the top of the arch of the foot—keeps the heel of the shoe in place against the foot when the dancer is en pointe.

Example Embodiments of the Smart Pointe Shoe

Figure 2:
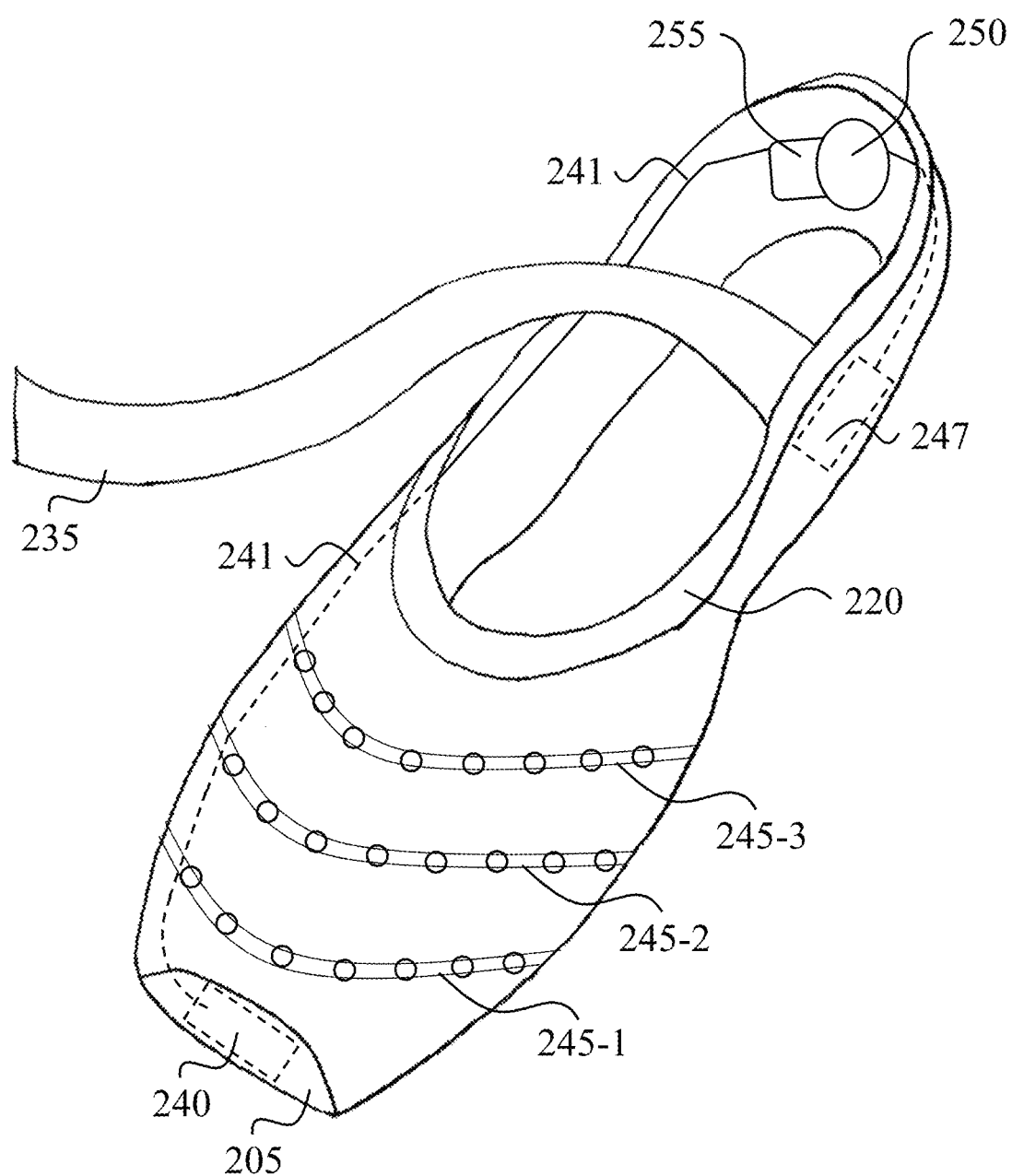
FIG. 2 shows a diagram of an example of a smart pointe shoe.

FIG. 2 shows a diagram of an example of a smart pointe shoe. This example includes some features and/or components that are similar to those shown in FIGS. 1A, 1B and 1C, and described above. At least some of these features and/or components may not be separately described in this section.

As shown in FIG. 2, LED ribbons (245-1, 245-2 and 245-3) are attached to the vamp of the pointe shoe. In the present patent document, the term LED ribbon, LED strand and LED strip are used interchangeably and refer to a plurality of LED lights on a single (and common) conductive connector. A wire (241) is attached to the internal surface of the pointe shoe, and connects the pressure sensor (240) and the LED ribbons to the power source (250) and the control circuitry (255). In an example, the LED ribbon may be fairy string lights on a black wire. In some embodiments, the wire (241) is attached to the external surface of the pointe shoe. In yet other embodiments, the wire (241) may be placed in between an internal canvas layer and an outer satin layer. In yet other embodiments, the control circuitry includes a toggle switch that switches between the LEDs remaining off and LEDs being activated as a function of the pressure sensor. In yet other embodiments, the control circuitry includes a toggle switch that toggles between the LEDs being off, the LEDs remaining on and LEDs being activated as a function of the pressure sensor. In an example, the dancer may set the toggle switch to the desired mode prior to a training session or performance. In another example, the control circuitry (and the toggle switch) may be programmed using a wireless transceiver on the pointe shoe.

In some embodiments, the pressure sensor (240) may be implemented as a switch membrane, which is an electrical switch that can turn the LEDs on and off, and may be a circuit printed on flexible polyethylene terephthalate (PET, a common thermoplastic polymer resin). In other embodiments, the pressure sensor may be implemented as a capacitive sensor layer or using other tactile sensing modalities that are well known in the art. In some embodiments, and as shown in FIG. 2, the switch membrane (240) may be located inside the box of the pointe shoe and adjacent to the platform (205). In other embodiments, the switch membrane may be attached to the platform (205) on the external surface of the shoe, and covered with satin so as not to impede the performer's movements.

In some embodiments, and as shown in FIG. 2, the power source (250) is a button cell that is attached at the heel to an internal surface of the pointe shoe. In other embodiments, the power source may be a coin cell (also referred to as a button cell), a cylindrical battery or a rectangular battery. In an example, the battery may be rechargeable. In another example, the battery may be a nickel-cadmium battery, a nickel-metal hydride battery or a lithium-ion battery. The power source may be attached to an external surface of the pointe shoe. For example, a battery pack may be attached below the binding (220) and toward the back of the pointe shoe—this placement of the battery ensures that it does not impede or restrict the dancer's movements in the smart pointe shoes.

The pointe shoe shown in FIG. 2 may include one or more fabric ribbons (235), which when the shoe is worn, secure the pointe shoe to the performer's foot. In an example, the fabric ribbons may be wrapped in opposite directions around the ankle, overlapping one another so as to form a cross at the front. The ends are then tied together in a knot, which is then tucked under the ribbon on the inside of the ankle to hide it from view. In some embodiments, the ribbons may be attached to the binding (220) of the shoe, and may be included in addition to elastic straps. In other embodiments, the ribbons may be attached to the middle section of the pointe shoes that corresponding to the dancer's arch. In yet other embodiments, only ribbons or elastic straps may be employed. In yet other embodiments, LEDs may be attached to one or both of the ribbons.

In some embodiments, the pointe shoe may further include a radio frequency (RF) transceiver (247), capable of low-rate and low-latency wireless communication using a wireless protocol, that is connected to the pressure sensor and the power source. As discussed in the example above, the switch membrane in the box of the pointe shoe (or attached internally or externally to the platform of the pointe shoe) is activated when the performer goes en pointe. In some embodiments, the activation of the switch membrane triggers the RF transceiver, which signals the RF transceiver in the other pointe shoe, which may not be en pointe. However, the pointe shoe that is aloft may also activate its LEDs based on the received wireless signal. The position of the RF transceiver is not restricted to the embodiment shown in FIG. 2. It may be attached to either the external or internal surface of the pointe shoe, but should not impede the performer's movements in any way.

In some embodiments, the control circuitry (255) may implement a specific sequence of individual LED activations in the LED ribbons (245-1, 245-2, 245-3). In other embodiments, the RF transceiver may transmit wireless signals that instruct the control circuitry to implement the same or different sequence of individual LED activations in the other pointe shoe.

In an example, the wireless protocol that may be used includes but is not limited to IEEE 1394, Firewire, Universal Serial Bus (USB) 1.0 or higher, RS-232, Ethernet, Ultrawide Band (UWB), Zigbee, 60 GHz, Wi-fi, 802.11x (where x equals a, b, g, n, etc.), PSTN, Bluetooth, Bluetooth Low Energy (BLE), Radio Frequency (RF), Infrared (IR), cellular telephone, IEEE 802.15.1, CDMA, TDMA, FDMA, wireless, or any other proprietary or non-proprietary communication protocol.

Figure 3:
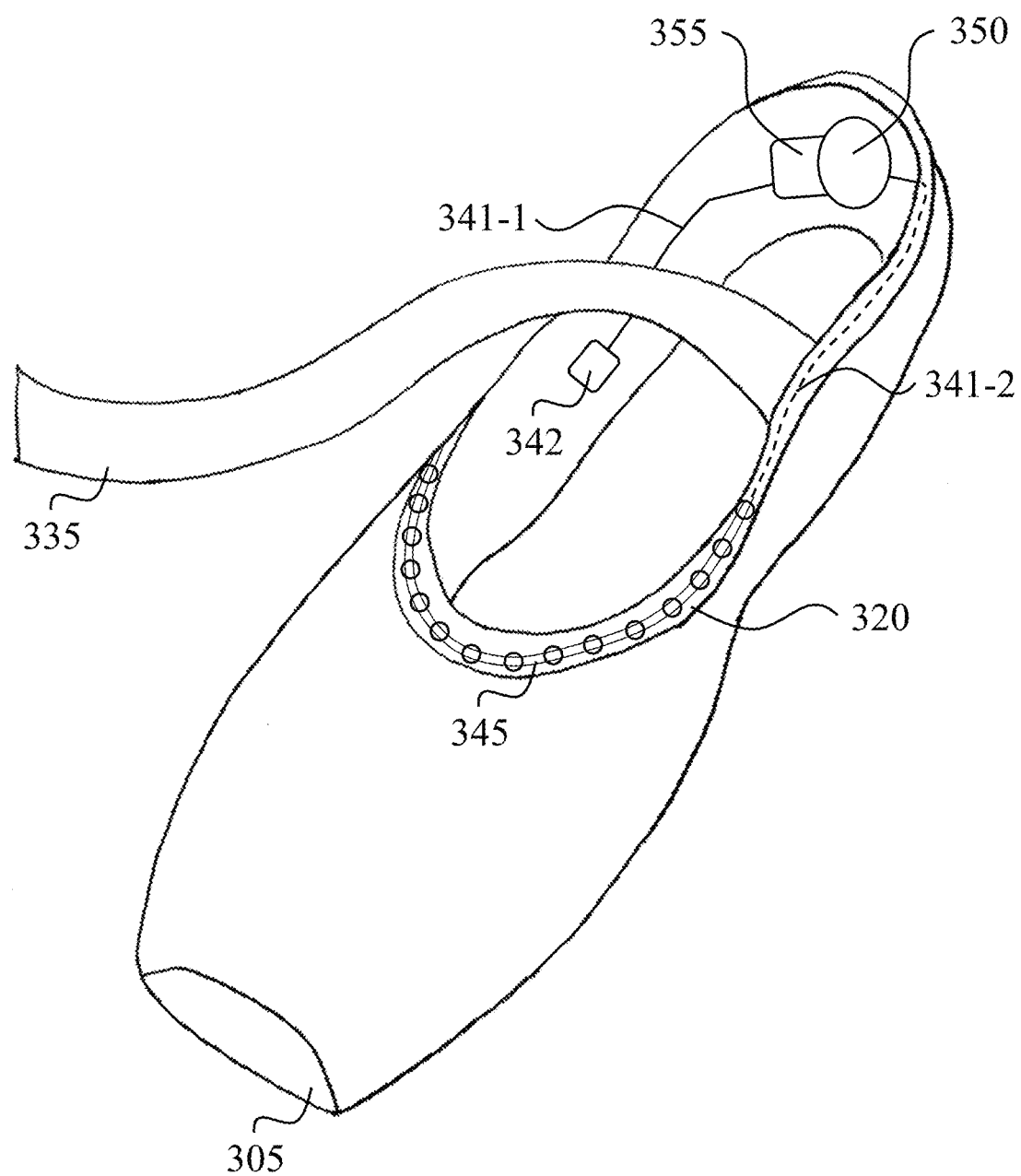
FIG. 3 shows a diagram of another example of a smart pointe shoe.

FIG. 3 shows a diagram of another example of a smart pointe shoe. This example includes some features and/or components that are similar to those shown in FIGS. 1A-1C and 2, and described above. At least some of these features and/or components may not be separately described in this section.

As shown in FIG. 3, an LED ribbon (345) may be attached to the front portion of the binding (320) of the pointe shoe. In other embodiments, the LED ribbon may be placed along the entire length of the binding, forming a continuous oval around the opening where the performer's foot fits into the pointe shoe. There may be a space between the LED lights on the LED ribbon as shown in FIG. 3. In other embodiments, there may be no space between the individual LED lights, thereby forming a solid, continuous strand of LED lights sewn into the binding. Different combinations and configurations of LED strands may be made according to style and preference, as long as they do not impede the dancer's ability to dance freely.

In some embodiments, the LED lights may emit light with wavelengths that span the range from 460 nm (nanometers) to 700 nm. For example, a blue color is displayed using light with a wavelength between 460 nm and 490 nm, whereas a red color uses light with a wavelength between 620 nm and 645 nm. In other embodiments, blacklight LEDs that emit ultraviolet with wavelengths between 310 nm and 450 nm may be used.

In some embodiments, the LED ribbons LEDs may be replaced (or augmented) by (with) other LED displays. For example, embodiments of the disclosed technology are compatible with any LED display including, by way of example, organic LED (OLED), active matrix OLED (AMOLED), flexible OLED (FOLED), phosphorescent OLED (PhOLED), polymer LED (PLED), passive matrix OLED (PMOLED), polymer OLED (POLED), resonant color OLED (RCOLED), small molecule OLED (SmOLED), stacked OLED (SOLED), transparent OLED (TOLED), neon organic iodine diode (NOID), or the like. In an example, a flexible OLED display may cover a portion of the vamp or the entire surface of the pointe shoe, and be connected to the switch membrane and power source using at least one wire.

FIG. 3 shows the power source (350) and control circuitry (355) connected to an accelerometer (342) using a wire (341-1) and to the LED ribbon on the front portion of the vamp using another wire (341-2). In this example, the speed of a performer's movement may be used to activate the LEDs. Different activation thresholds, which activate the LEDs at different speeds, may be set based on creative and artistic choices. For example, the time elapsed since a certain point in the performance may trigger different sequences of LEDs. In another example, the number of times the performer goes en pointe may be used to determine LED activation.

Figure 4:
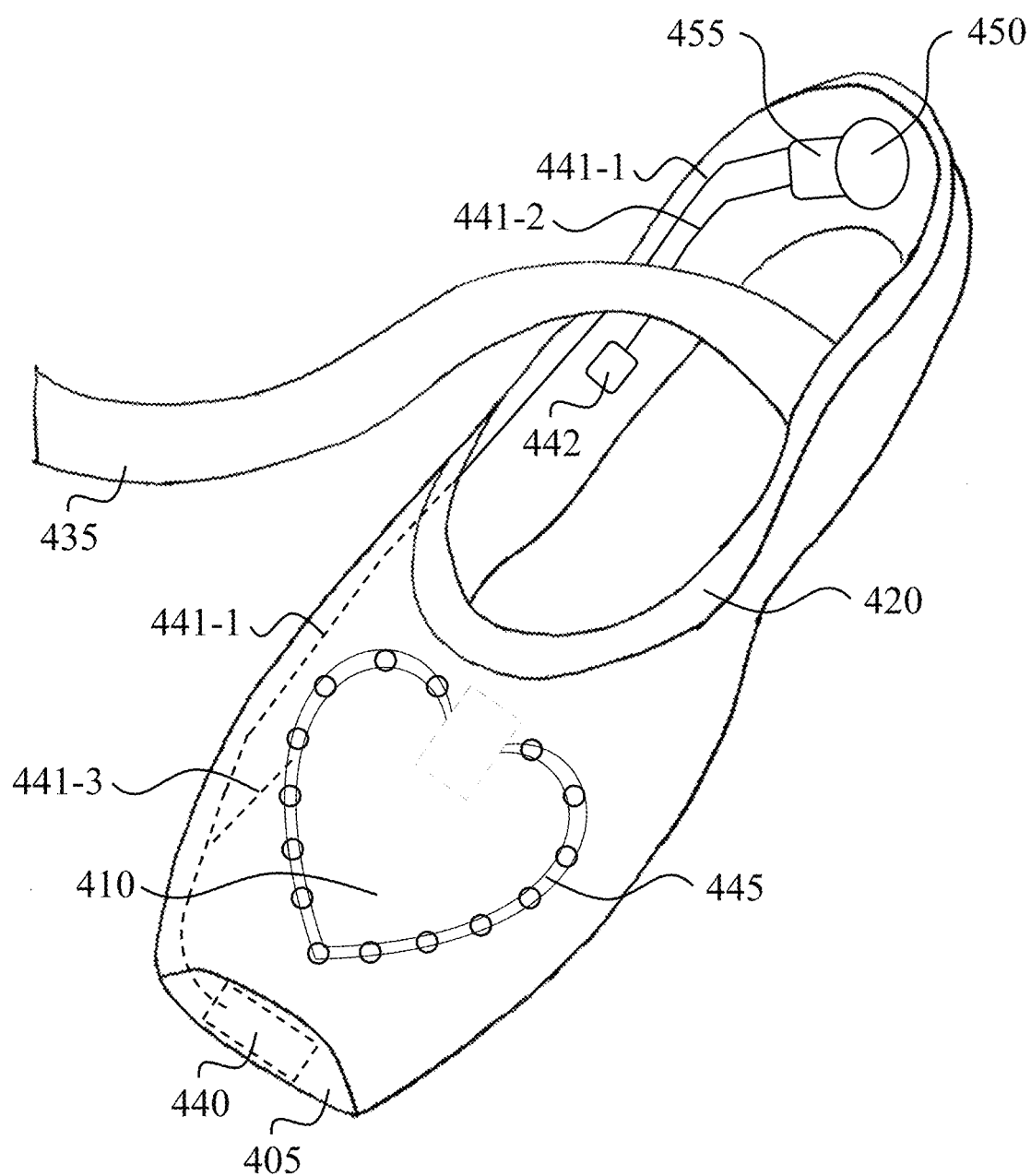
FIG. 4 shows a diagram of yet another example of a smart pointe shoe.

FIG. 4 shows a diagram of yet another example of a smart pointe shoe. This example includes some features and/or components that are similar to those shown in FIGS. 1A-1C, 2 and 3, and described above. At least some of these features and/or components may not be separately described in this section.

In some embodiments, LEDs may be attached to the pointe shoe in different styles and shapes. For example, as shown in FIG. 4, an LED ribbon (445) is attached to the external surface of the shoe in the shape of a heart. Herein, the LEDs are activated based on either or both of an accelerometer (442) and a switch membrane (440). The control circuitry (455) may include a toggle switch that switches between the LEDs remaining off and LEDs being activated as a function of the switch membrane or the accelerometer.

In other embodiments, the toggle switch may be configured to switch between the LEDs remaining off, the LEDs being activated by the accelerometer (442), and the LEDs being activated by the switch membrane (440). In yet other embodiments, the toggle switch may be configured to switch between the LEDs remaining off, the LEDs always remaining on, and the LEDs being activated by either one or both of the accelerometer and the switch membrane.

Examples Embodiments of Pressure Sensor Configurations

Figure 5A:
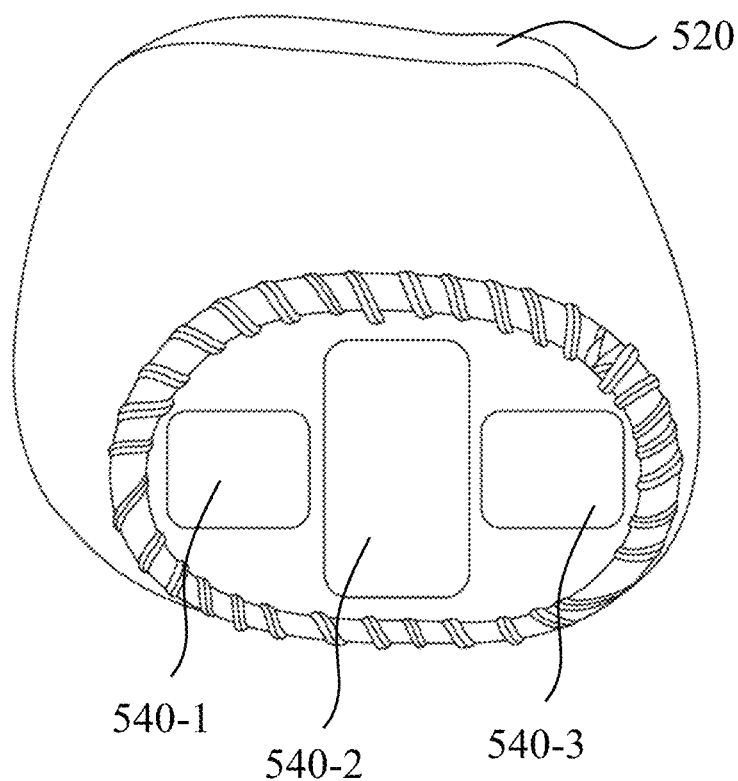
FIGS. 5A and 5B show example pressure sensor configurations on the platform of a smart pointe shoe.
Figure 5B:
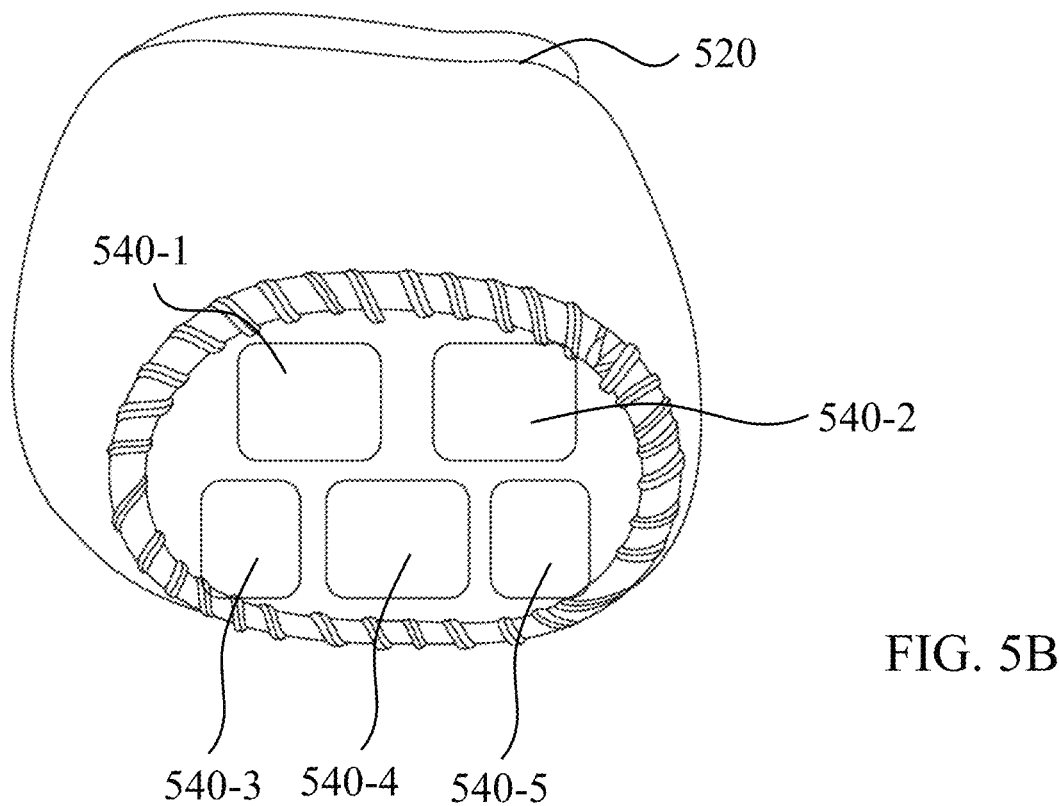

In some embodiments, and shown in FIGS. 2 and 4, a single pressure sensor may be used adjacent to the platform of the pointe shoe. In other embodiments, and as shown in FIGS. 5A and 5B, multiple pressure sensors in different configurations may be used on the platform of a pointe shoe. In an example, the embodiment shown in FIG. 5A may be used in a ballet studio for training, and in particular, to determine whether a ballet dancer is correctly standing en pointe. The three different pressure sensors (denoted 540-1, 540-2 and 540-3 in FIG. 5A) may be coupled to different sets of lights. A given set of lights only turns on when the coupled pressure sensor is pressed. Thus, only the set of lights coupled with the pressure sensor on which the dancer is placing the majority of his/her weight is activated. The appropriate lights turning on show that the dancer is practicing proper technique.

FIG. 5B shows an example that divides the platform into more regions using multiple (and smaller) pressure sensors (denoted 540-1 through 540-5 in FIG. 5B). In an example, one or more LEDs on a specific area or side of the shoe may light up corresponding to the specific pressure sensor that has been activated.

In some embodiments, having multiple sensors on the platform advantageously enables the smart footwear to be used for training, and specifically, to develop better dancing technique. For example, the pressure sensors may be configured such that a particular sensor corresponding to the correct weight distribution (and technique) of the dancer may be activated to then turn on the LEDs. This would result in the LEDs lighting up when the dancer performs a particular move (e.g., en pointe) correctly, but would not light up if the weight distribution or technique was incorrect, or could still be improved.

In an example, the pressure sensors are configured to provide a binary (on/off) output that results in the coupled lights turning on or off, respectively. In another example, the pressure sensors are configured to provide an output value (e.g., a value in millivolts in a predetermined range) that results in the intensity of the coupled lights varying based on the output value (e.g., a higher output value from the pressure sensor resulting in a brighter light). In yet another example, the output value may be compared to a threshold, which results in the coupled lights turning on or off based on a result of the comparison.

In some embodiments, the one or more pressure sensors may be embedded in platform of the pointe shoe. If the sensor were placed inside the shoe, the typically tight fit of the pointe shoes would result in the LEDs turning on far more often than when the dancer was en pointe. If the sensor were placed on the outside of the shoe, the calibration and placement of the pressure sensor would be difficult to achieve. Thus, in some embodiments of the disclosed technology the one or more pressure sensors are embedded into the platform of the pointe shoe. In these type of pointe shoes, the box (and platform) is typically made from tightly packed layers of paper and fabric that have been glued together and then shaped into an enclosure, and the pressure sensor can be integrated into the packed layers of paper and fabric during the construction of the box and platform. In other embodiments, the pressure sensors may be placed between the platform and a layer of dance rubber, suede or pleather (but not inside the shoe so as to be in direct contact with the dancer's feet). In these alternate type of pointe shoes, the box may be made from plastic and rubber, with rigidity provided by the plastic, and the pressure sensor can be integrated during its construction.

Figure 6A:
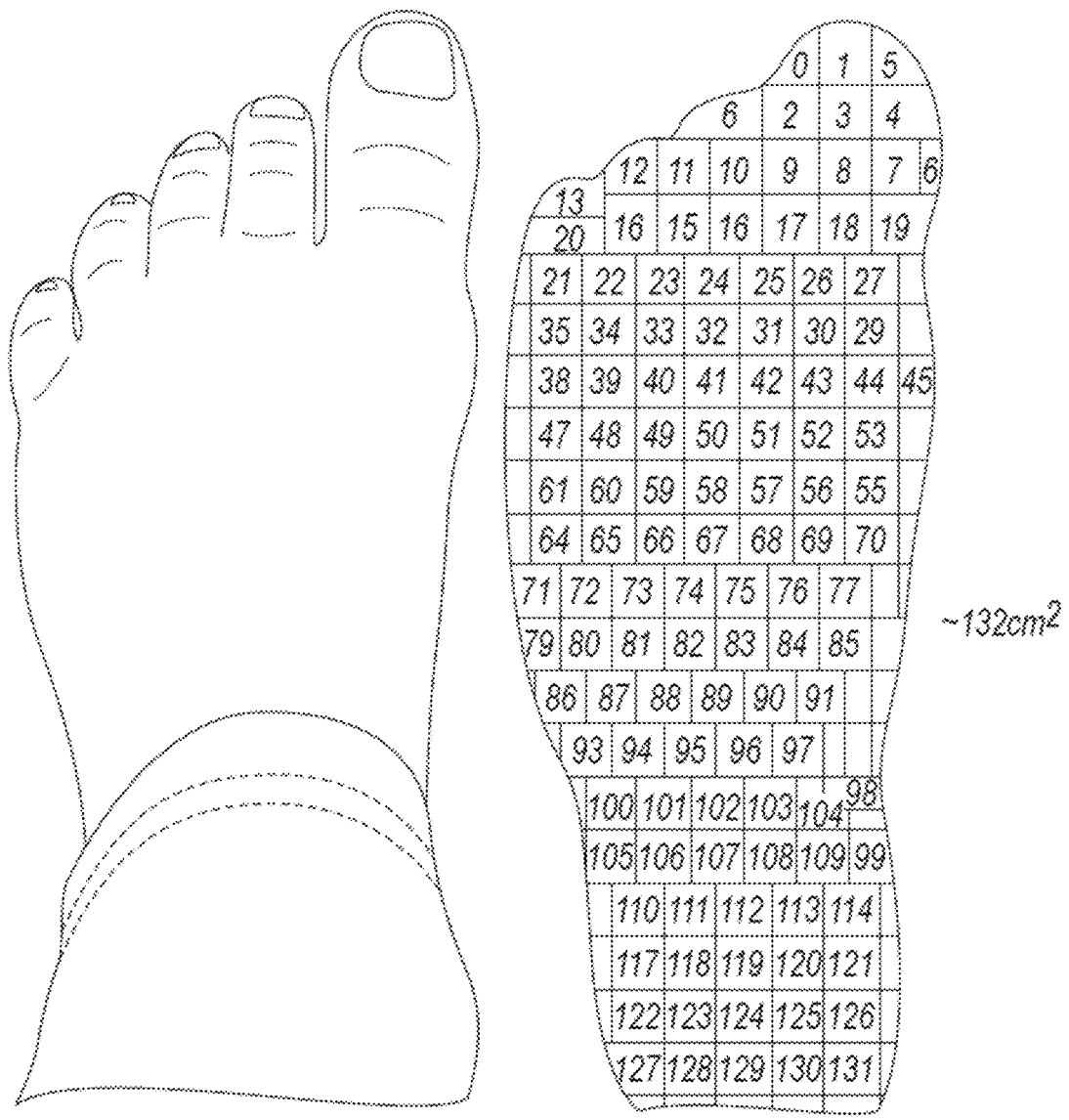
FIGS. 6A and 6B show examples of calibrating one or more pressure sensors in smart pointe shoes.
Figure 6B:
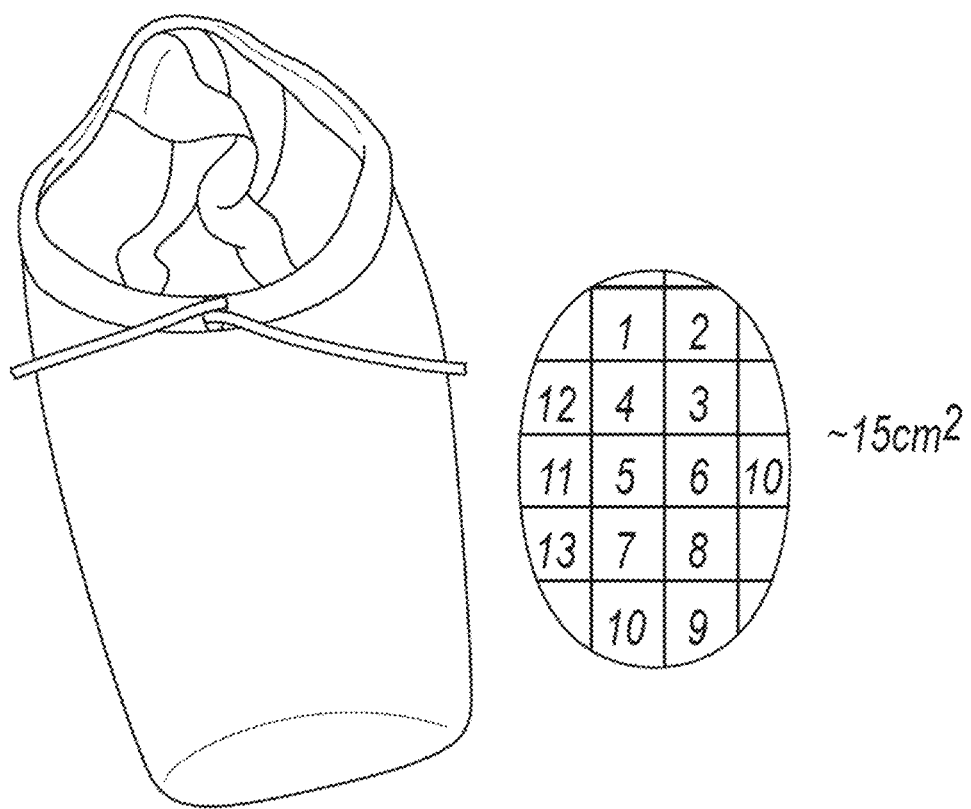

In some embodiments, the pressure sensor may be calibrated based on the age range or weight of the dancer (e.g., activates only when a minimum amount of weight, or equivalently force, has been applied to the pressure sensor). For example, FIG. 6A shows that the area of one foot is approximately 132 $cm^2$, and assuming a weight of the dancer is 105 lbs., the pressure on the two feet of the dancer is approximately 17.8 kPa. On the other hand, and as shown in FIG. 6B, the total are of the platform of one pointe shoe is 15 $cm^2$, and thus the pressure on the single pointe shoe that is in contact with the ground is approximately 300 kPa, or roughly 17 times the pressure experienced when standing normally on two feet. Thus, in an example, the calibration of the pressure sensors can be based on this type of calculation that is based on the weight of the dancer. For another example, the calibration process may be further based on the age of the dancer, which advantageously enables the pressure sensors to be customized to the user.

Example Embodiments of Batteries and Switches

In some embodiments, the disclosed technology may include the switch providing a first mode wherein the LEDs are always on and a second mode in which the LEDs are activated by a pressure sensor. In the former mode, the pressure sensor is effectively disabled, whereas in the latter mode, different LEDs on the shoe may be triggered by one or more of multiple pressure sensors that are placed adjacent to the platform of the pointe shoe (or equivalently, in the appropriate location for other dance footwear).

In some embodiments, the battery and pressure sensor(s) are selected so as to provide equivalent brightness in both the modes described above. In particular, a length of the connector for the pressure sensor must be selected in conjunction with the battery—if the connector is too long, then the brightness of the LEDs in the second mode (pressure activated) will be fainter than in the first mode (always on). In general, the types and lengths of the wires and connectors, and the battery, may be selected to ensure that the brightness of the LEDs in both the first and second modes are equivalent, thereby enhancing a performance that uses the disclosed technology.

An example of the disclosed technology includes, but is not limited to, the following components that may be arranged in one or more of the configuration described in this patent document:

- 2032 coin cell (with a 3.0 V nominal voltage) may be used for the battery
- Coin cell (battery) case with height 1.1 inches and width 0.75 inches
- 1 mm long switch on top of the battery case
- ZRX-543 push button pressure sensor (3 inch length, 1 mm width)

4.5 inch wire connecting pressure sensor to the battery LED strand; 30 LEDs spaced 2 inches apart (e.g., SKU DR-MOON-114)

In some embodiments, the battery may be coupled to the pressure sensor and/or the LEDs and/or the switch using wires that are located in between the (outer) satin and (inner) canvas layers of the pointe shoe. This advantageously ensures that the wires will no snag and interfere with the performance and is aesthetically pleasing. In other embodiments, the battery may be a coin cell that is sewn into a pocket that is directly adjacent to the switch (or the switch may be stacked on top of the battery) and located near the elastic of the pointe shoe. It is noted that the battery and switch may be placed either (i) on the elastic or (ii) below the elastic on the outside of the shoe, and care must be taken to ensure that the battery/switch combination does not cover both the elastic and the outside of the shoe (or spill over from the elastic), as this may hamper the dancer's movements. In yet other embodiments, switching between the two modes may be implemented using a micro switch (e.g., toggle, rocker or slide switches).

Example Embodiments of Pointe Shoe Construction

In some embodiments, the pressure sensor can be embedded in the platform of the pointe shoe, and thus, it may be included when the pointe shoe is being constructed. This would enable the pressure sensor to be placed and calibrated properly. Furthermore, the pointe shoe could be semi-broken in (e.g., applying pressure to gently crush the box and/or bending the shank), by the manufacturer, to ensure that the dancer purchased the pointe shoe with a correctly placed and calibrated pressure sensor. In some embodiments, the pointe shoes may be semi-broken in prior to the integration of the LEDs so as to eliminate damage to the electronics. In other embodiments, dancers may be provided with specific instructions as to how to continue to break-in the pointe shoes so as to not damage the electronics (which may result if the shoe is bent too much). In yet other embodiments, flexible elements and materials (including, but not limited to, the pressure sensor and LEDs) are used to implement embodiments of the disclosed technology so as to minimize damage to the electronics when the shoe is worn regularly or further broken-in as it continues to be worn and used. In yet other embodiments, the smart pointe shoes may be constructed, broken-in by the dancer, and then returned to the manufacturer to ensure that the components (e.g., one or more of the pressure sensor, LEDs, battery, switch and/or wiring) are functioning properly.

In some embodiments, the one or more pressure sensors are spread over the entirety of the platform, extending up to the edge of the platform meeting the vamp.

In some embodiments, the LEDs may be integrated into the body of the shoe during construction. In an example, the wires could be hidden beneath the outer satin layer. In another example, the LEDs may be embedded into the satin and canvas layers, thereby laying flat on the surface and not protruding. As noted previously, LEDs comprising flexible wires and LED materials may be manufactured (or selected) for embedding in the pointe shoe. Embodiments of the disclosed technology include the LEDs being placed in any configuration that does not come into contact with the edge connecting the platform to the vamp.

In some embodiments, and as described in the various embodiments in this document, the battery, switch and one or more LED strands (or ribbons, or strips) are positioned on the outer surface of the dance footwear so that they do not touch the dancer's skin. In an example, when the battery and switch are positioned on the elastic for pointe shoes or ballet slippers, their location is selected so as not to bleed over the edge of the elastic.

Example Embodiments for Kits for Producing a Smart Pointe Shoe

Figure 7:
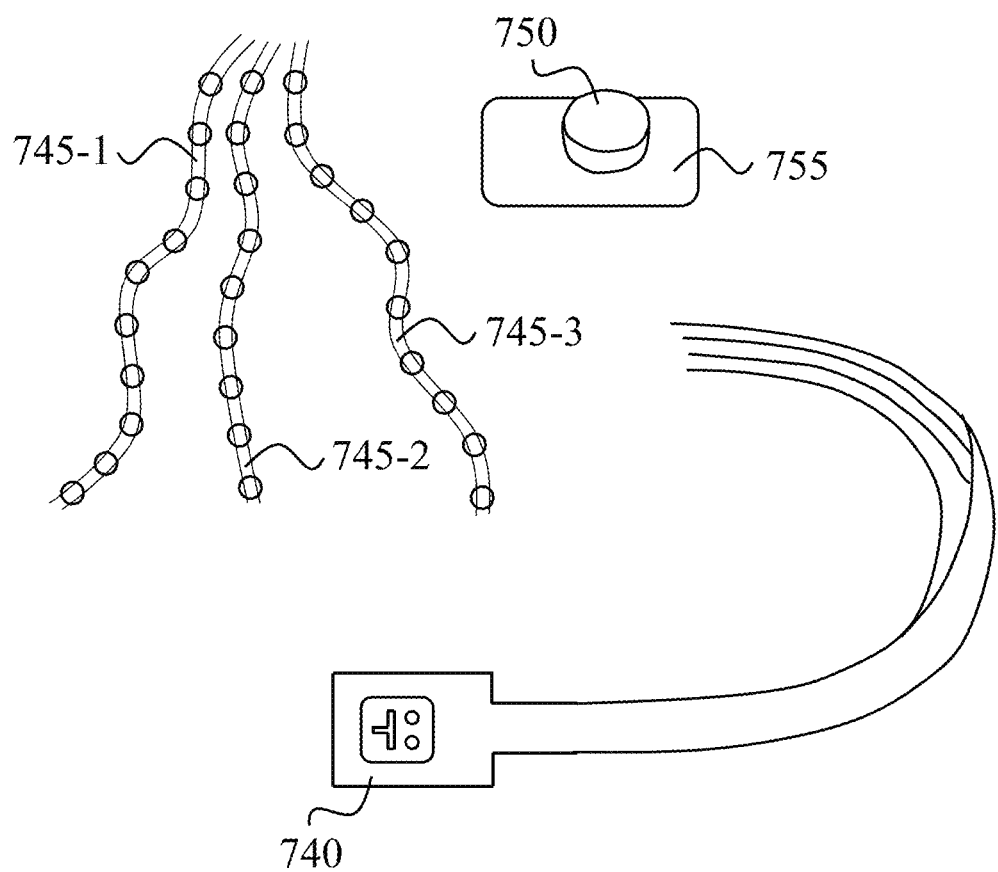
FIG. 7 shows a diagram of an example of a kit for enhancing a pointe shoe.

In the examples in FIGS. 2-4, described above, a smart pointe shoe features LEDs, a power source, and sensors that include accelerometers and switch membranes. In contrast, FIG. 7 shows a diagram of an example of a kit that may be used to enhance (or transform, or upgrade, or "smartify") a pointe shoe in a "do it yourself" approach. In some embodiments, the kit may include LED ribbons (745-1, 745-2, 745-3), a button cell (also known as a coin cell) power source (750) connected to control circuitry (755), and a switch membrane (740) that may be connected to the power source and control circuitry.

These components may be attached to the pointe shoe using basic sewing equipment. In an example, a needle and thread may be included in the kit to facilitate the attachment of the kit components to the external and internal surfaces of the pointe shoe. In other embodiments, the kit may include, for example, an accelerometer, different configurations and styles of LEDs, and different types of power sources.

Figure 8:
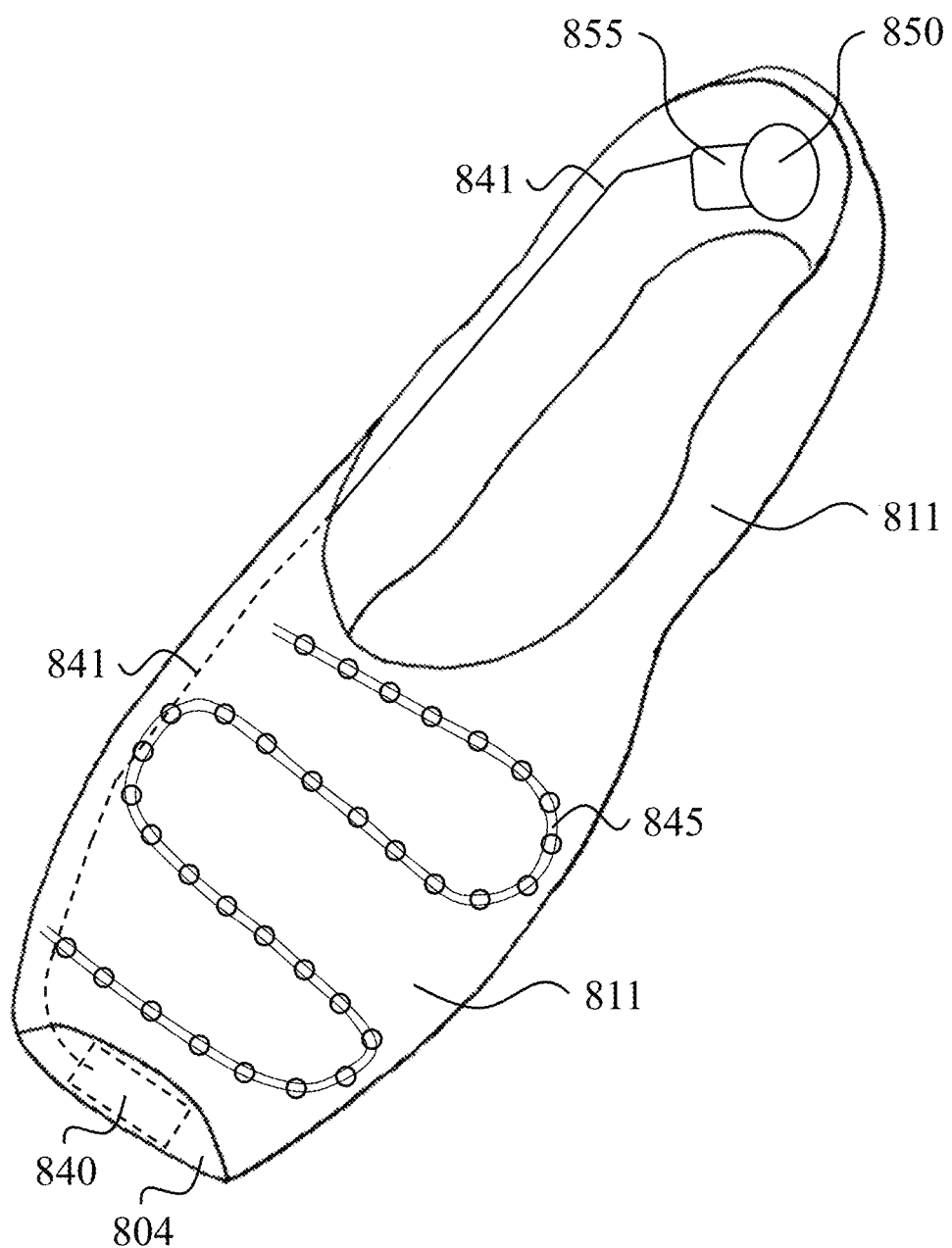
FIG. 8 shows a diagram of another example of a kit for enhancing a pointe shoe.

FIG. 8 shows a diagram of another example of a kit for enhancing a pointe shoe. In this example, the kit includes some features and/or components that are similar to those shown in FIGS. 1A-1C, 2, 3 and 4, and described above. At least some of these features and/or components may not be separately described in this section.

Keeping with the "do it yourself" approach, the kit shown in FIG. 8 is an example of a kit to enhance a pointe shoe that may be attached to the shoe in a simpler procedure. The kit includes a pointe shoe cover that is comprises a body (811), a toe portion (804) and a sole on the bottom surface of the body (not shown in FIG. 8), and which has the features and enhancements (described in previous examples) embedded. The body of the pointe shoe cover is configured to envelop, or wrap around, the pointe shoe such that the toe portion aligns with the platform of the pointe shoe.

In some embodiments, an LED ribbon (845) is embedded into the vamp of the body of the pointe shoe cover. The LED ribbon is connected to the button cell power source (850) and control circuitry (855) using a wire (841) that is affixed to the internal surface of the pointe shoe cover. In an example, a switch membrane (840) may be attached to an internal surface of the toe portion (804) of the pointe shoe cover.

In some embodiments, the body (811) of the pointe shoe cover may be made of lycra spandex, nylon spandex, cotton, wool, nylon, polyester, acrylic, spandex, silk, cashmere, mohair, or olefins (such as polypropylene), any blend of the aforementioned materials, or the like. The material of the body of the pointe shoe must be form-fitting so as to be able to snugly wrap around the pointe shoe. In other embodiments, the pointe shoe cover may be made of one or more layers of heat shrink wrap film, which can be configured to fit around the pointe shoe, and then conform to its shape with the application of heat. Various tints and thicknesses of heat shrink wrap film may be used to ensure that the electrical and electronic components are not adversely affected during the enhancement of the pointe shoe.

In some embodiments, the pointe shoe cover may be configured for one-time use. For example, treating a pointe shoe cover made from a specific type of heat shrink wrap film may result in a snug, form-fitting outer layer that functions as desired, but may not be readily removable. In other embodiments, a different type of heat shrink wrap film may be used for the body of the pointe shoe cover, and may be removable even after the heat treatment. Similarly, the lycra and nylon spandex bodies may be configured for one-time use or to be removed and reused.

In some embodiments, the toe portion of the pointe shoe cover may be made of satin, stretch satin, dance rubber, suede leather, canvas, leather, suede, or the like. This advantageously enables the toe portion to support the switch membrane and remain flush with the platform of the pointe shoe. In other embodiments, the sole of the pointe shoe cover may be made of dance rubber, suede leather, canvas, leather, suede, or the like. In yet other embodiments, the pointe shoe cover may feature elastic straps and/or ribbons to ensure that a form-fitting snug fit is maintained when using the pointe shoe cover.

Example Embodiments of Smart Dance Performance Footwear

Figure 9A:
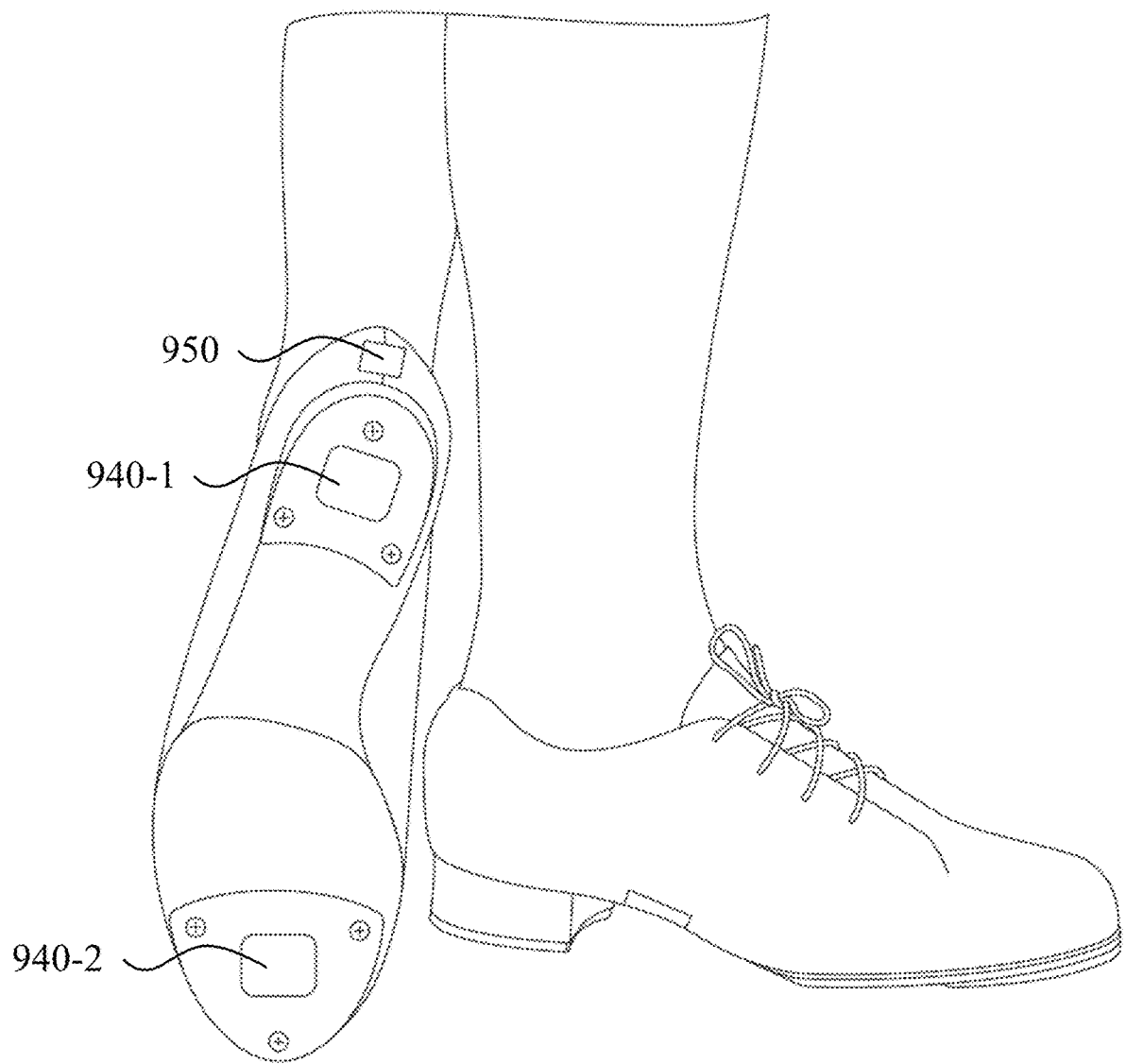
FIGS. 9A-9E show examples of different types of performance shoes with pressure sensor and battery placement.
Figure 9B:
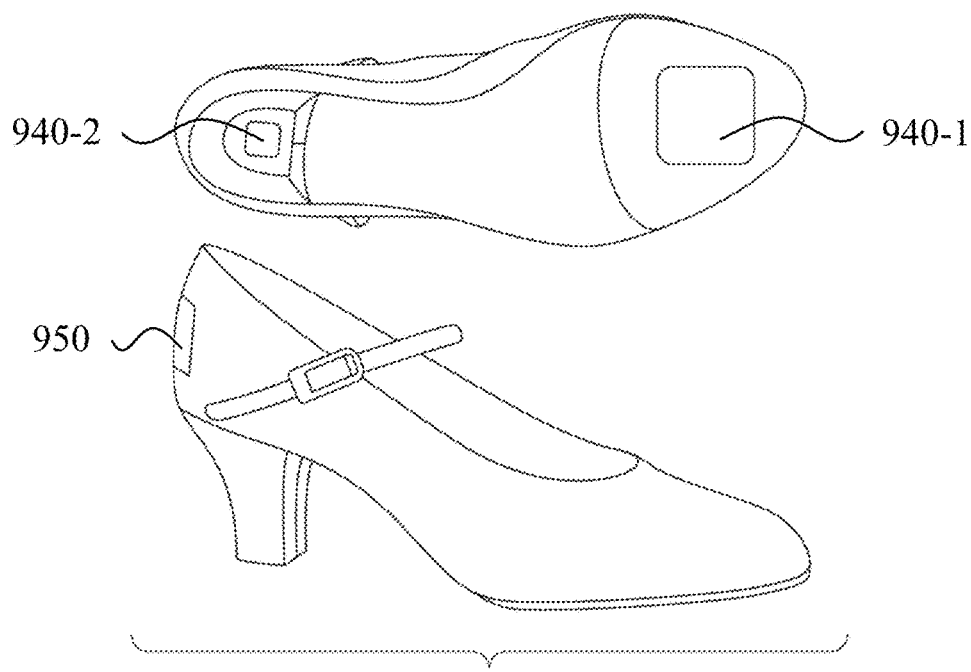
Figure 9C:
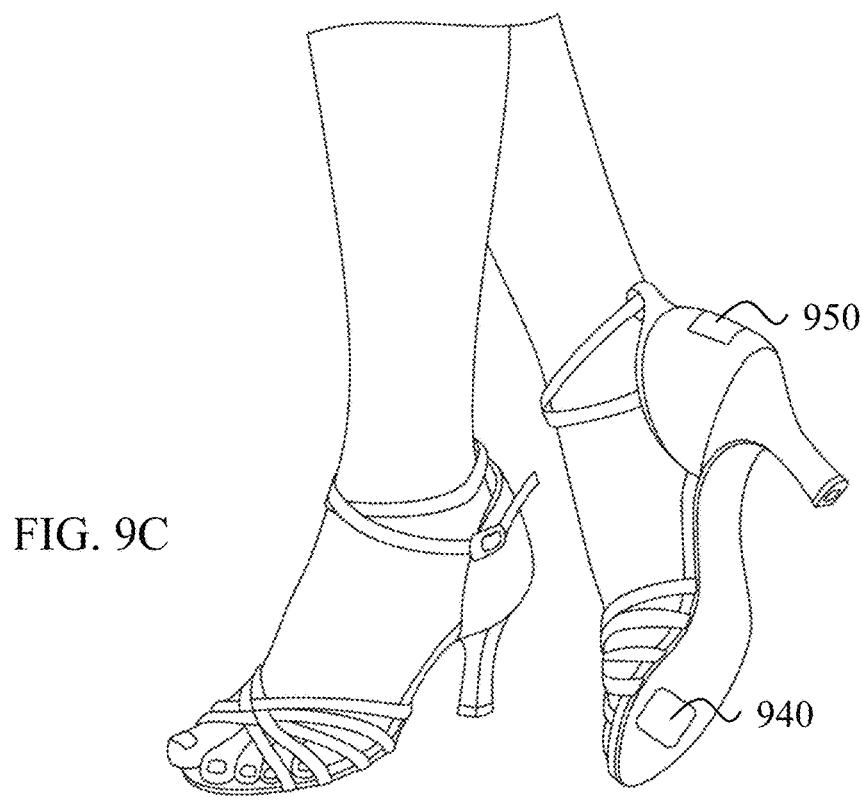
Figure 9D:
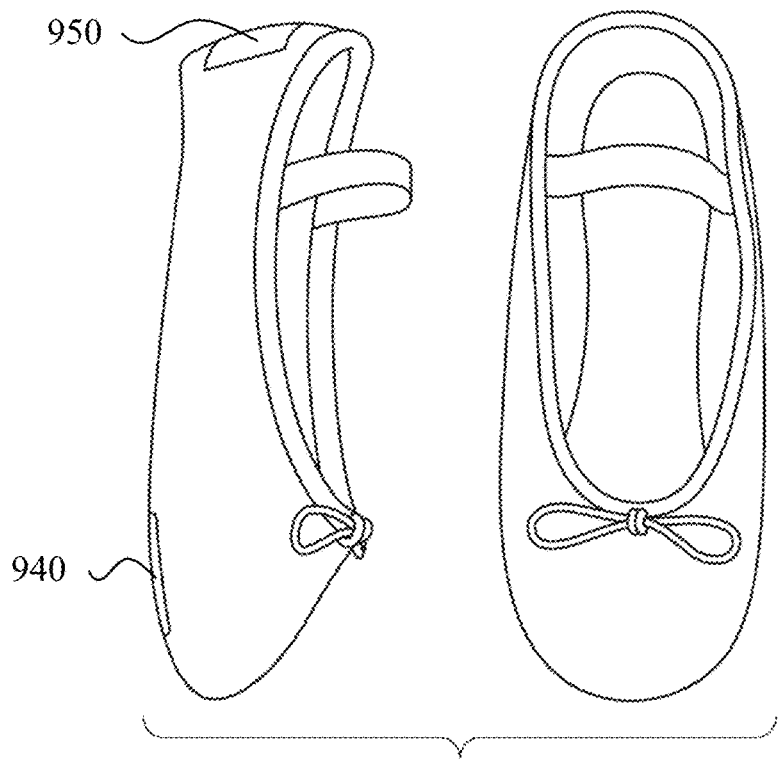
Figure 9E:
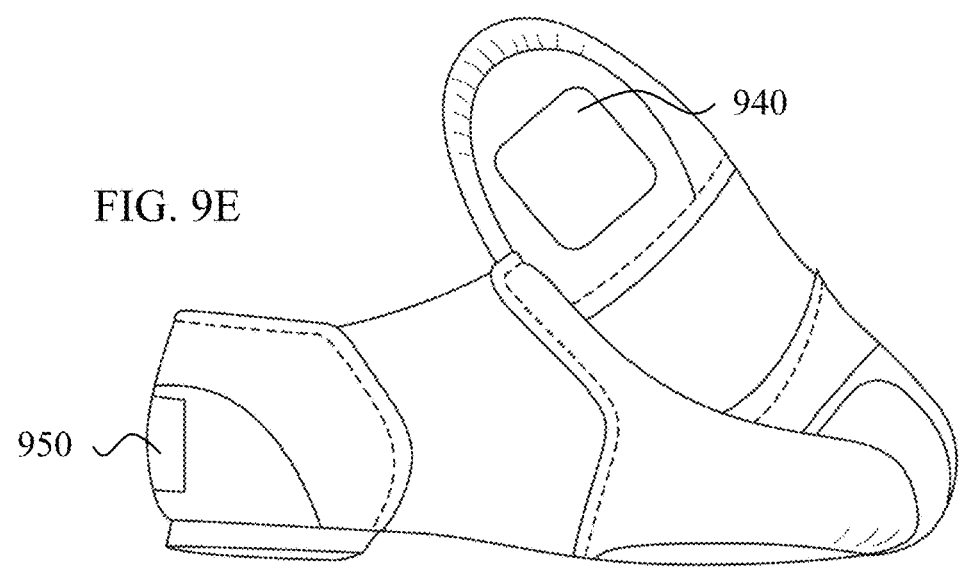

FIGS. 9A-9E show examples of different types of performance shoes with the sensor (denoted 940 or 940-x) and battery (denoted 950) placement design for that particular type of footwear. In the case of tap shoes (e.g., FIG. 9A), the (one or more) sensor(s) may be placed on, or integrated into, the front "tap" and the heel "tap". FIGS. 9B and 9C show character and ballroom shoes, respectively, with sensors in both the heel and toe portions (e.g., under the ball of the foot) of the sole of the shoes. FIG. 9E shows jazz shoes with the sensor in the front portion of the sole, similar to the positioning for ballet slippers (e.g., FIG. 9D). In each of the embodiments shown in FIGS. 9A-9E, the battery is placed to cause minimal interference (e.g., does not come in contact with any element of the other shoe, the floor or other objects). Although not specifically shown in FIGS. 9A-9E, LEDs may be placed on the shoes in a variety of configurations, similar to the examples described in the case of the pointe shoes, and so as not to impede the movements of the performer or dancer.

Example Embodiments of Smart Dance Footwear and Wireless Device Interaction

Figure 10:
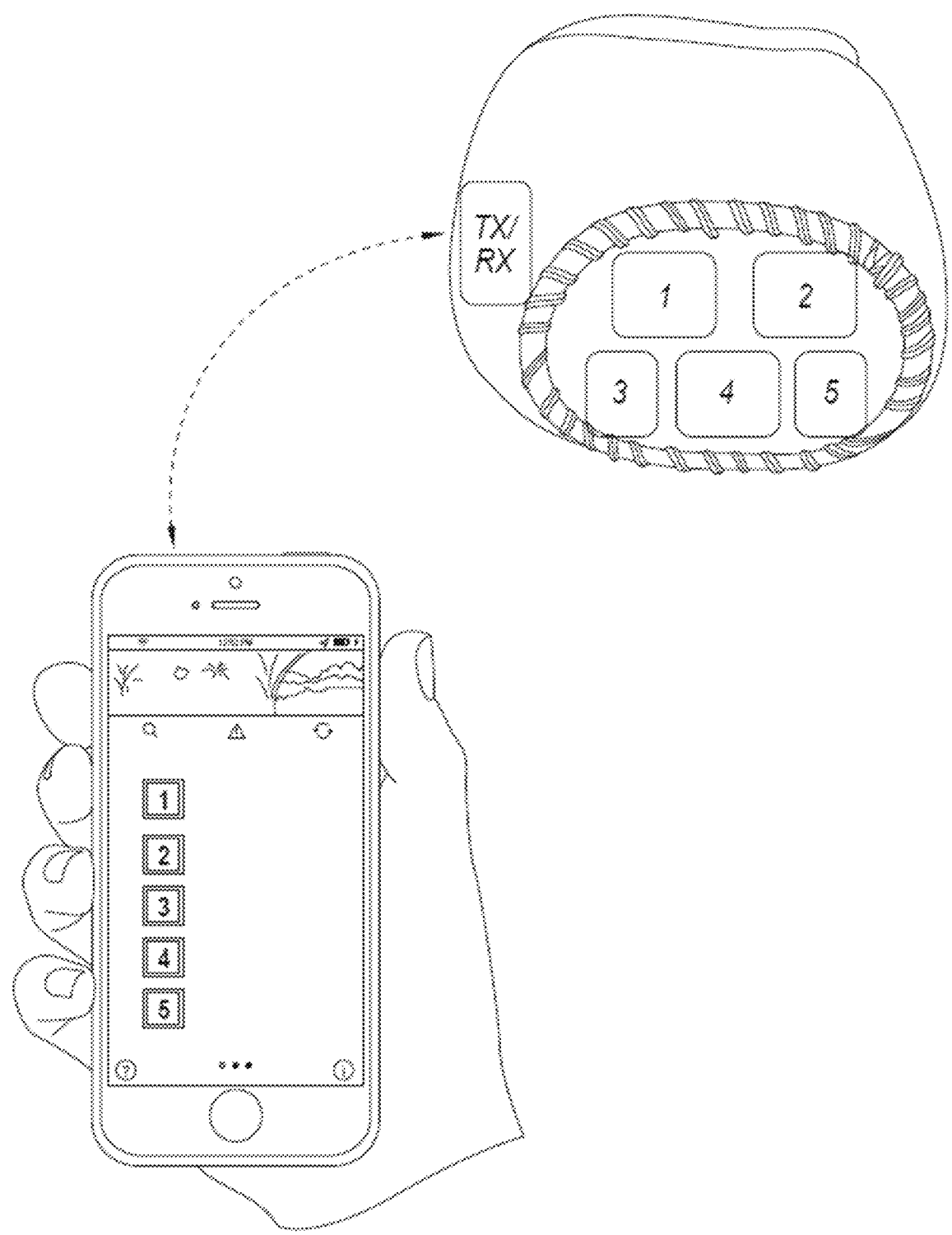
FIG. 10 shows an example of the smart pointe shoe interacting with a wireless device.
Figure 11:
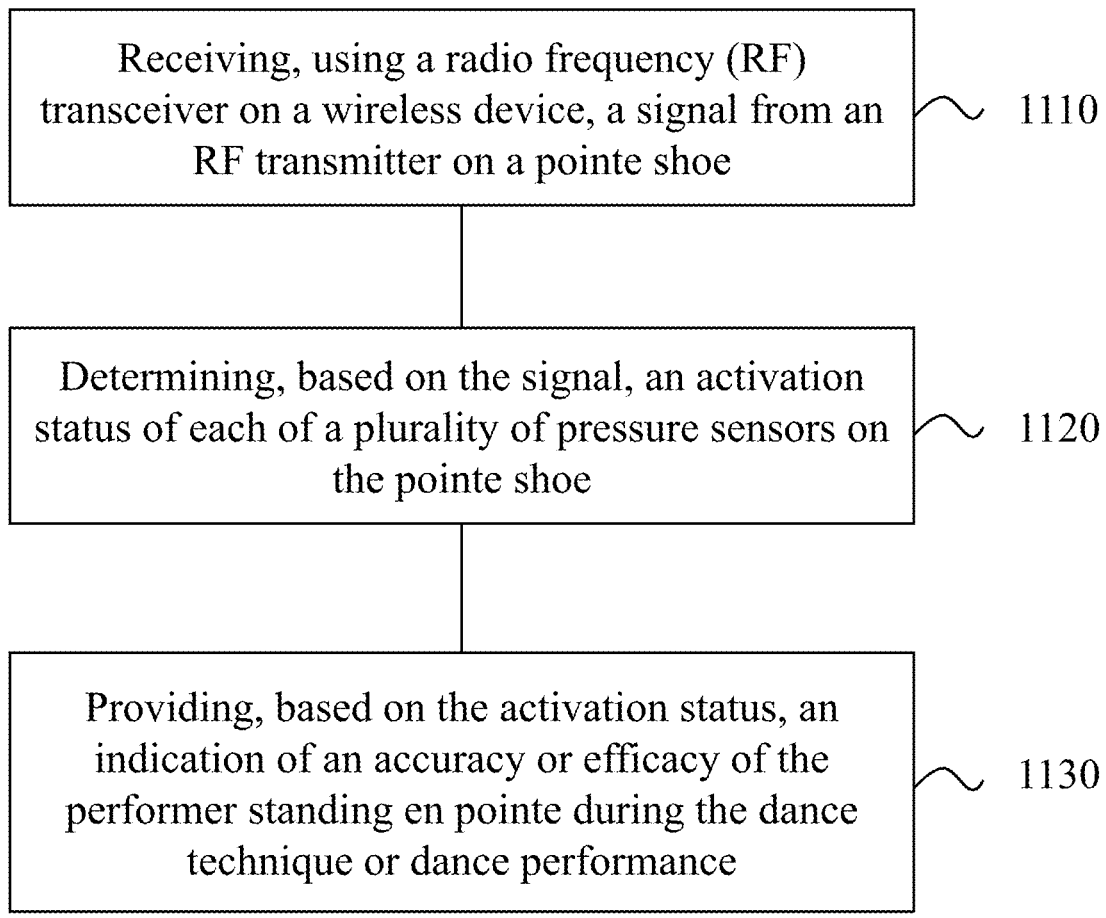
FIG. 11 is a flowchart of an example method of using a smart pointe shoe.

Some embodiments of the disclosed technology, as shown in FIG. 10, include a wireless-capable device (e.g., a mobile phone, tablet, computer, laptop, etc.) that can be paired with the smart dance footwear, and which communicates with the smart dance footwear using the wireless transceiver on the dance shoe. As shown in FIG. 10, the wireless transceiver in the smart shoe may implement a wireless protocol (e.g., Bluetooth, cellular, Wi-Fi or Zigbee) over which the data from the smart footwear can be sent to the wireless device. More generally, the wireless protocol is a low-rate and low-latency wireless communication protocol.

In some embodiments, the wireless device may be configured to include a specific software application that can interface with the smart dance footwear. The wireless device, and the software application thereupon, can be customized for each dancer and can be used for both training purposes and to interact with other aspects of dance training and performance.

In some embodiments, the wireless-capable device can synchronize (in real-time) with a pair of dance shoes and all the dancer's movements tracked by the shoes (e.g., based on the LEDs and pressure sensors activating). In an example, some of the statistics that may be collected by the wireless device include speed, consistency, accuracy and timing (e.g., of performing a dance technique or move, or a series of steps). In another example, the wireless device could be paired with the dance shoes for multiple dancers to track the synchronicity between dancers. In yet another example, the collected statistics may be used to set goals for individual dancers or a group, and then use to measure/track progress towards those goals.

In some embodiments, the wireless device can be further configured to include a social interaction (or social media) interface where dancers can connect with other dancers using the shoes. In an example, users may have individual profiles, with the option of sharing the information (e.g., performance results, progress during practice, statistics collected) with other dancers. In another example, a dance troupe may have a profile that aggregates the information of all the dancers in the troupe.

In yet another example, the statistics collected by the smart footwear and the wireless device may be shared with a dance instructor, who can then evaluate the dancer's technique based on the data collected and provide feedback. Using multiple pressure sensors, as shown in FIG. 10, advantageously enables the dancer's technique to be represented in a format that uses far less storage capacity (and bandwidth when being transmitted) then video frames, and would allow the dance instructor to evaluate the dancer's technique remotely (or off-site) in real-time using the app. In yet another example, the wireless device may be used by a dancer to message or talk to other dancers using the app.

In yet another example, the wireless device may be used to search for information related to dance, e.g., dance companies, job openings in the dance world, dance supplies, dance industry news and/or tutorials from teachers and professional dancers. For example, the wireless device may communicate with other applications and websites (e.g., SeeDance, Amazon) to enable a dancer to use other resources while remaining in the specific software application itself. For example, a dancer may receive a product recommendation from another dancer, and may then purchase that product directly through the specific software application on the wireless device.

In some embodiments, the wireless device can include a "gamification" aspect, which applies typical elements of game playing (e.g., point scoring, competition with others, rules of play) to dance performance, technique and training in order to encourage participation of and amongst dancers. In an example, the workout associated with being able to perform a dance routine may be customized by a particular dancer and shared with other dancers, and the particular dancer would receive goal badges and points if that routine was used by other members of her dance troupe. In another example, if a certain technique was practiced a fixed number of times and the correct LEDs lit up (indicating proper technique and execution of that dance aspect) a predetermined number of times, then a goal badge may be received by that dancer. In yet another example, participating in performances may be tracked by the app, and achievement badges obtained upon their completion. In yet another example, the statistics collected may be used to award points or badges based on predetermined performance goals, or relative to other dancers in the same troupe or different troupe.

Embodiments of the disclosed technology relate to a system for improving a dance technique or a dance performance by a performer, comprising a pointe shoe, comprising: a light-emitting diode (LED) ribbon affixed to an external surface of the pointe shoe, a power source, a rigid enclosure within a front end of the pointe shoe that encases and supports toes of the performer, wherein a front end of the rigid enclosure is flattened to form a platform upon which the performer can balance when standing en pointe, a plurality of pressure sensors, in the rigid enclosure or affixed to the platform, configured to activate when the performer stands en pointe during the dance performance, wherein the each of the plurality of pressure sensors comprises a capacitive layer, and wherein standing en pointe comprises the performer standing on the tips of their toes, a radio frequency (RF) transmitter operatively connected to the plurality of pressure sensors and configured to be activated when at least one of the plurality of pressure sensors is activated, and at least one wire connecting the power source to the LED ribbon, the plurality of pressure sensors and the RF transmitter; and a wireless device comprising: a processor, and an RF transceiver, wherein the processor is configured to: receive, using the RF transceiver, a signal from the RF transmitter, determine, based on the signal, an activation status of each of the plurality of pressure sensors, and provide, based on the activation status, an indication of an accuracy or efficacy of the performer standing en pointe during the dance technique or dance performance.

In some embodiments, the RF transmitter and the RF transceiver use a low-rate and low-latency wireless communication protocol.

In some embodiments, the activation status is determined further based on a calibration process that is configured using an age or a weight of the performer.

In some embodiments, the pointe shoe further comprises a toggle switch configured to switch between the LED ribbon remaining off and the LED ribbon being activated as a function of the plurality of pressure sensors.

In some embodiments, the pointe shoe further comprises an accelerometer, and wherein the toggle switch is further configured to being activated as a function of the accelerometer.

In some embodiments, the LED ribbon is affixed to a binding of the pointe shoe.

In some embodiments, the LED ribbon is affixed to a vamp of the pointe shoe.

In some embodiments, the pointe shoe further comprises an accelerometer, and wherein the processor is further configured to extract, from the signal, accelerometer data, and track, based on the accelerometer data, one or more movements of the performer during the dance performance.

In some embodiments, the examples described above may be implemented as a method for improving a dance technique or a dance performance by a performer. The method 1100 includes, at operation 1110, receiving, using a radio frequency (RF) transceiver on a wireless device, a signal from an RF transmitter on a pointe shoe.

The method includes, at operation 1120, determining, based on the signal, an activation status of each of a plurality of pressure sensors on the pointe shoe.

The method includes, at operation 1130, providing, based on the activation status, an indication of an accuracy or efficacy of the performer standing en pointe during the dance technique or dance performance.

In some embodiments, the determining the activation status is further based on a calibration process, and wherein the method further comprises performing, based on an age or a weight of the performer, the calibration process.

In some embodiments, the RF transmitter and the RF transceiver use a low-rate and low-latency wireless communication protocol.

In some embodiments, the pointe shoe further comprises a toggle switch configured to switch between the LED ribbon remaining off and the LED ribbon being activated as a function of the plurality of pressure sensors.

In some embodiments, the pointe shoe further comprises an accelerometer, and wherein the toggle switch is further configured to being activated as a function of the accelerometer.

Embodiments of the disclosed technology relate to a kit for enhancing a pointe shoe for improving a dance technique or a dance performance by a performer, the kit comprising a pointe shoe, comprising: a rigid enclosure within a front end of the pointe shoe that encases and supports toes of the performer, wherein a front end of the rigid enclosure is flattened to form a platform upon which the performer can balance when standing en pointe, and a piece of rigid material that stiffens a sole of the pointe shoe to provide support for an arch of an en pointe foot of the performer; a light-emitting diode (LED) ribbon; a power source; a plurality of pressure sensors; a radio frequency (RF) transmitter; and at least one wire, wherein the LED ribbon is configured to be affixed to an external surface of the pointe shoe, wherein the plurality of pressure sensors is configured to be inserted into the rigid enclosure or affixed to the platform, and to activate when the performer stands en pointe during the dance performance, wherein the each of the plurality of pressure sensors comprises a capacitive layer, and wherein standing en pointe comprises the performer standing on the tips of their toes, wherein the RF transmitter is configured to be operatively connected to the plurality of pressure sensors, and to be activated when at least one of the plurality of pressure sensors is activated, wherein the at least one wire is configured to connect the power source to the LED ribbon, the plurality of pressure sensors and the RF transmitter, and wherein a wireless device that is paired to the pointe shoe is configured to: receive a signal from the RF transmitter affixed to the pointe shoe, determine, based on the signal, an activation status of each of the plurality of pressure sensors, and provide, based on the activation status, an indication of an accuracy or efficacy of the performer standing en pointe during the dance technique or dance performance.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for improving a dance technique or a dance performance by a performer, comprising:
a pointe shoe, comprising:
a light-emitting diode (LED) ribbon affixed to an external surface of the pointe shoe,
a power source,
a rigid enclosure within a front end of the pointe shoe that encases and supports toes of the performer, wherein a front end of the rigid enclosure is flattened to form a platform upon which the performer can balance when standing en pointe,
a plurality of pressure sensors, in the rigid enclosure or affixed to the platform, configured to activate when the performer stands en pointe during the dance performance, wherein the each of the plurality of pressure sensors comprises a capacitive layer, and wherein standing en pointe comprises the performer standing on the tips of their toes,
a radio frequency (RF) transmitter operatively connected to the plurality of pressure sensors and configured to be activated when at least one of the plurality of pressure sensors is activated, and
at least one wire connecting the power source to the LED ribbon, the plurality of pressure sensors and the RF transmitter; and
a wireless device comprising:
a processor, and
an RF transceiver,
wherein the processor is configured to:
receive, using the RF transceiver, a signal from the RF transmitter,
determine, based on the signal, an activation status of each of the plurality of pressure sensors, and
provide, based on the activation status, an indication of an accuracy or efficacy of the performer standing en pointe during the dance technique or dance performance.

2. The system of claim 1, wherein the RF transmitter and the RF transceiver use a low-rate and low-latency wireless communication protocol.

3. The system of claim 1, wherein the activation status is determined further based on a calibration process that is configured using an age or a weight of the performer.

4. The system of claim 1, wherein the pointe shoe further comprises:
a toggle switch configured to switch between the LED ribbon remaining off and the LED ribbon being activated as a function of the plurality of pressure sensors.

5. The system of claim 4, wherein the pointe shoe further comprises an accelerometer, and wherein the toggle switch is further configured to being activated as a function of the accelerometer.

6. The system of claim 1, wherein the LED ribbon is affixed to a binding of the pointe shoe.

7. The system of claim 1, wherein the LED ribbon is affixed to a vamp of the pointe shoe.

8. The system of claim 1, wherein the pointe shoe further comprises an accelerometer, and wherein the processor is further configured to:
extract, from the signal, accelerometer data; and
track, based on the accelerometer data, one or more movements of the performer during the dance performance.

9. A method for improving a dance technique or a dance performance by a performer, comprising:
receiving, using a radio frequency (RF) transceiver on a wireless device, a signal from an RF transmitter on a pointe shoe;
determining, based on the signal, an activation status of each of a plurality of pressure sensors on the pointe shoe; and
providing, based on the activation status, an indication of an accuracy or efficacy of the performer standing en pointe during the dance technique or dance performance,
wherein the pointe shoe comprises:
a light-emitting diode (LED) ribbon affixed to an external surface of the pointe shoe,
a power source,
a rigid enclosure within a front end of the pointe shoe that encases and supports toes of the performer, wherein a front end of the rigid enclosure is flattened to form a platform upon which the performer can balance when standing en pointe, and
at least one wire connecting the power source to the LED ribbon, the plurality of pressure sensors and the RF transmitter,
wherein the plurality of pressure sensors, in the rigid enclosure or affixed to the platform, is configured to activate when the performer stands en pointe during the dance performance, wherein the each of the plurality of pressure sensors comprises a capacitive layer, and wherein standing en pointe comprises the performer standing on the tips of their toes, and
wherein the RF transmitter is operatively connected to the plurality of pressure sensors and configured to be activated when at least one of the plurality of pressure sensors is activated.

10. The method of claim 9, wherein the determining the activation status is further based on a calibration process, and wherein the method further comprises:
performing, based on an age or a weight of the performer, the calibration process.

11. The method of claim 9, wherein the RF transmitter and the RF transceiver use a low-rate and low-latency wireless communication protocol.

12. The method of claim 9, wherein the pointe shoe further comprises:
a toggle switch configured to switch between the LED ribbon remaining off and the LED ribbon being activated as a function of the plurality of pressure sensors.

13. The method of claim 12, wherein the pointe shoe further comprises an accelerometer, and wherein the toggle switch is further configured to being activated as a function of the accelerometer.

14. The method of claim 9, wherein the LED ribbon is affixed to a binding or a vamp of the pointe shoe.

15. A kit for enhancing a pointe shoe for improving a dance technique or a dance performance by a performer, the kit comprising:
a pointe shoe, comprising:
a rigid enclosure within a front end of the pointe shoe that encases and supports toes of the performer, wherein a front end of the rigid enclosure is flattened to form a platform upon which the performer can balance when standing en pointe, and
a piece of rigid material that stiffens a sole of the pointe shoe to provide support for an arch of an en pointe foot of the performer;
a light-emitting diode (LED) ribbon;
a power source;
a plurality of pressure sensors;

a radio frequency (RF) transmitter; and
at least one wire,
wherein the LED ribbon is configured to be affixed to an external surface of the pointe shoe,
wherein the plurality of pressure sensors is configured to be inserted into the rigid enclosure or affixed to the platform, and to activate when the performer stands en pointe during the dance performance, wherein the each of the plurality of pressure sensors comprises a capacitive layer, and wherein standing en pointe comprises the performer standing on the tips of their toes,
wherein the RF transmitter is configured to be operatively connected to the plurality of pressure sensors, and to be activated when at least one of the plurality of pressure sensors is activated,
wherein the at least one wire is configured to connect the power source to the LED ribbon, the plurality of pressure sensors and the RF transmitter, and
wherein a wireless device that is paired to the pointe shoe is configured to:
receive a signal from the RF transmitter affixed to the pointe shoe,
determine, based on the signal, an activation status of each of the plurality of pressure sensors, and
provide, based on the activation status, an indication of an accuracy or efficacy of the performer standing en pointe during the dance technique or dance performance.

16. The kit of claim 15, wherein the RF transmitter uses a low-rate and low-latency wireless communication protocol.

17. The kit of claim 15, further comprising:
a toggle switch configured to be affixed to the pointe shoe, operatively connected to the power source and the LED ribbon, and switch between the LED ribbon remaining off and the LED ribbon being activated as a function of the plurality of pressure sensors.

18. The kit of claim 17, further comprising:
an accelerometer configured to be affixed to the pointe shoe, and operatively connected to the power source and the toggle switch,
wherein the toggle switch is further configured to switch between the plurality of LEDs remaining off and the plurality of LEDs being activated as a function of the accelerometer.

19. The kit of claim 15, wherein the LED ribbon is affixed to a binding or a vamp of the pointe shoe.

20. The kit of claim 15, wherein the wireless device is further configured to:
perform, based on an age or a weight of the performer, a calibration process, wherein determining the activation status is further based on the calibration process.

* * * * *